(12) United States Patent
Saito

(10) Patent No.: US 9,509,860 B2
(45) Date of Patent: Nov. 29, 2016

(54) FUNCTION EXECUTION APPARATUS AND SCREEN INFORMATION SERVER

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/867,757

(22) Filed: Sep. 28, 2015

(65) Prior Publication Data

US 2016/0094728 A1    Mar. 31, 2016

(30) Foreign Application Priority Data

Sep. 29, 2014    (JP) ................................. 2014-198193

(51) Int. Cl.
*H04N 1/00*    (2006.01)
*H04N 1/32*    (2006.01)
*G06F 3/12*    (2006.01)

(52) U.S. Cl.
CPC ........ *H04N 1/00204* (2013.01); *G06F 3/1204* (2013.01); *G06F 3/1224* (2013.01); *G06F 3/1284* (2013.01); *H04N 1/00392* (2013.01); *H04N 1/00395* (2013.01); *H04N 1/00411* (2013.01); *H04N 1/00474* (2013.01); *H04N 1/00501* (2013.01); *H04N 1/32406* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 5,101,283 | A | * | 3/1992 | Seki ................... H04N 1/00411 358/3.03 |
|---|---|---|---|---|
| 6,848,081 | B1 | | 1/2005 | Yoda et al. |
| 7,362,216 | B2 | | 4/2008 | Li |
| 8,422,055 | B2 | | 4/2013 | Honda |
| 2009/0240673 | A1 | | 9/2009 | Nagasaki |
| 2009/0254843 | A1 | * | 10/2009 | Van Wie ............. H04L 12/1822 715/757 |
| 2010/0029303 | A1 | | 2/2010 | Lim et al. |
| 2011/0058500 | A1 | | 3/2011 | Nagasaki |
| 2011/0162085 | A1 | | 6/2011 | Nagasaki |
| 2011/0231902 | A1 | | 9/2011 | Nagasaki et al. |
| 2011/0258339 | A1 | | 10/2011 | Matsui et al. |
| 2013/0135640 | A1 | | 5/2013 | Nagasaki |

(Continued)

FOREIGN PATENT DOCUMENTS

| JP | 11-242677 A | 9/1999 |
|---|---|---|
| JP | 2000-354124 A | 12/2000 |

(Continued)

OTHER PUBLICATIONS

U.S. Office Action for related U.S. Appl. No. 13/627,684 mailed Mar. 18, 2014.

(Continued)

*Primary Examiner* — Jerome Grant, II
(74) *Attorney, Agent, or Firm* — Merchant & Gould P.C.

(57) ABSTRACT

A function execution apparatus is configured to execute a specific function relating to a specific service that is to be provided by a service providing server. A screen information server is configured to supply, to the function execution apparatus, screen information for enabling a user to select setting information corresponding to a setting item relating to the specific service.

19 Claims, 18 Drawing Sheets

(56) References Cited

U.S. PATENT DOCUMENTS

| | | | |
|---|---|---|---|
| 2015/0347070 A1* | 12/2015 | Ha | H04N 1/00411 358/1.15 |
| 2016/0134930 A1* | 5/2016 | Swafford | H04N 21/43637 725/80 |

FOREIGN PATENT DOCUMENTS

| | | | |
|---|---|---|---|
| JP | 2001-273228 A | 10/2001 | |
| JP | 2007-226563 A | 9/2007 | |
| JP | 2013-109730 A | 6/2013 | |

OTHER PUBLICATIONS

U.S. Office Action for related U.S. Appl. No. 13/627,684 mailed Sep. 16, 2014.

* cited by examiner

FIG. 2

DISPLAY NAME TABLE 36

| DISPLAY NAME | SERVER NAME | ACCESS TOKEN | PIN CODE |
|---|---|---|---|
| ALICE | SERVER A | XXXXXXXX | 1234 |
| KEN | SERVER A | YYYYYYYY | 2345 |
| ALICE | SERVER B | ZZZZZZZZ | 3456 |
| ⋮ | ⋮ | ⋮ | ⋮ |

SC INFORMATION STORAGE AREA 38

SC1
0105ALICE
02041234
030201
0408XXXXXXXX
050201
061420140904132354
~38a

SC2
0105ALICE
02043456
030202
0408ZZZZZZZZ
050201
~38b

SC3
SCAN FORMAT=PDF
SCAN SIZE=A4
SCAN DUPLEX=OFF
UPLOAD FOLDER=FOLDER PC90
~38c

...

ID TABLE 66

| INFORMATION TYPE | ID |
|---|---|
| DISPLAY NAME | 01 |
| PIN CODE | 02 |
| SERVER NAME | 03 |
| ACCESS TOKEN | 04 |
| FUNCTION | 05 |
| SETTING ID | 06 |

| FUNCTION | ID |
|---|---|
| SCAN UPLOAD | 01 |
| DOWNLOAD PRINT | 02 |
| ⋮ | ⋮ |

| SERVER NAME | ID |
|---|---|
| SERVER A | 01 |
| SERVER B | 02 |
| ⋮ | ⋮ |

FIG. 14 (CASE B2)

*FIG. 18*

| CASE | USER'S OPERATIONS | OPERATIONS OF MULTIFUNCTIONAL DEVICE 10 |
|---|---|---|
| A1 | SHORTCUT SELECTION→ ADD SELECTION→WEB SELECTION→ SERVER NAME SELECTION→ DISPLAY NAME SELECTION→ FUNCTION SELECTION→ FORMAT SELECTION→PROFILE INPUT | FIRST TYPE SC INFORMATION (SC1) REGISTRATION |
| A2 | WEB SELECTION→ SERVER NAME SELECTION→ DISPLAY NAME SELECTION→ FUNCTION SELECTION→ FORMAT SELECTION→PROFILE INPUT | SCAN UL EXECUTION→FIRST TYPE SC INFORMATION (SC1) REGISTRATION |
| A3 | FIRST TYPE SC INFORMATION (SC1) SELECTION | SCAN UL EXECUTION |
| B1 | WEB SELECTION→ SERVER NAME SELECTION→ DISPLAY NAME SELECTION→ FUNCTION SELECTION→REGISTRATION | SECOND TYPE SC INFORMATION (SC2) REGISTRATION |
| B2 | SECOND TYPE SC INFORMATION (SC2) SELECTION→ FORMAT SELECTION→ PROFILE INPUT + OK | SCAN UL EXECUTION→ FIRST TYPE SC INFORMATION (SC4) REGISTRATION |
| C1 | SHORTCUT SELECTION→ ADD SELECTION→ SCAN SELECTION→ SCAN SETTING INPUT | THIRD TYPE SC INFORMATION (SC3) REGISTRATION |
| C2 | THIRD TYPE SC INFORMATION (SC3) SELECTION | SCAN EXECUTION |

FUNCTION EXECUTION APPARATUS AND SCREEN INFORMATION SERVER

CROSS-REFERENCE TO RELATED APPLICATION

This application claims priorities from Japanese Patent Application No. 2014-198193 filed on Sep. 29, 2014, the entire subject matters of which is incorporated herein by reference.

TECHNICAL FIELD

The present disclosure relates to a function execution apparatus configured to execute a specific function relating to a specific service that is to be provided by a service providing server. Also, the specification discloses a screen information server configured to supply, to the function execution apparatus, screen information for enabling a user to select setting information corresponding to a setting item relating to the specific service.

BACKGROUND

In the related art, a multifunctional device that stores, in a memory, respective symbolic information corresponding to each character string for displaying a scan setting screen when an instruction for generating a shortcut corresponding to the scan setting screen is issued. When a selection instruction for selecting the shortcut is issued, the multifunctional device supplies the respective symbolic information in the memory to a relay server. Thereby, the multifunctional device acquires scan setting screen information from the relay server and displays the scan setting screen.

After passing the selection instruction to the multifunctional device to display the scan setting screen, a user of the multifunctional device may have to additionally input a desired scan setting on the scan setting screen.

SUMMARY

The present disclosure has been made in view of the above circumstances, and one of objects of the present disclosure is to provide a configuration capable of enabling a function execution apparatus to execute desired processing by performing less information input operations than the related art is provided.

According to an illustrative embodiment of the present disclosure, there is provided a function execution apparatus including: a display unit; a user interface; a function execution unit including at least one of a scanner unit and a printer unit; a processor; and memory. The memory stores computer readable instructions that, when executed by the processor, causing the apparatus to perform: screen information acquisition processing of acquiring a plurality of pieces of screen information from the screen information server when the user interface is operated by a user to issue a first predetermined instruction, each of the plurality of pieces of screen information representing a selection screen for enabling the user to select setting information corresponding to a setting item relating to a specific service that is provided by a service providing server; display control processing of sequentially displaying each of the plurality of selection screens represented by the plurality of pieces of screen information on the display unit; setting information supply processing of supplying L pieces of setting information, wherein L is an integer of 2 or larger, the setting information being selected the user interface is operated by the user on the plurality of selection screens, to the screen information server; first information group acquisition processing of acquiring a first information group including position information and M pieces of relation information, where M is an integer of 1 or larger and smaller than L, relating to M pieces of setting information of among the L pieces of setting information, from the screen information server as the L pieces of setting information is supplied to the screen information server, the position information being information for reading out N pieces of specific information, where N is an integer of 1 or larger and smaller than L, registered in the screen information server, and the N pieces of specific information including N pieces of setting information, which is different from the M pieces of setting information, among the L pieces of setting information; storing control processing of storing the first information group in the memory; first information group supply processing of supplying the first information group in the memory to the screen information server when the user operates the user interface to issue a first selection instruction for selecting the first information group in a state where the first information group is stored in the memory; execution instruction information acquisition processing of acquiring execution instruction information from the screen information server as the first information group is supplied to the screen information server, the execution instruction information including at least one piece of setting information among the L pieces of setting information, which includes the N pieces of setting information included in the N pieces of specific information read out by the screen information server in accordance with the position information in the first information group and the M pieces of setting information relating to the M pieces of relation information in the first information group; function execution processing of causing the function execution unit to execute a specific function relating to the specific serve by utilizing at least one piece of the setting information included in the execution instruction information when the execution instruction information is acquired from the screen information server; and first communication processing of receiving the specific service from a first service providing server when the execution instruction information is acquired from the screen information server.

According to another illustrative embodiment of the present disclosure, there is provided a screen information server including: a processor; and memory. The memory stores computer readable instructions that, when executed by the processor, causing the screen information server to perform: screen information supply processing of supplying a plurality of pieces of screen information to a function execution apparatus, the plurality of pieces of screen information representing a plurality of selection screens for enabling a user of the function execution apparatus to select setting information corresponding to a plurality of setting items relating to a specific service that is provided by a service providing server; setting information acquisition processing of acquiring L pieces of setting information, where L is an integer of 2 or larger, from the function execution apparatus, the L pieces of setting information including a plurality of setting information that is to be selected on a plurality of selection screens represented by the plurality of pieces of screen information by the user; registration processing of registering N pieces of specific information, where N is an integer of 1 or larger and smaller than L, in the memory, the N pieces of specific information including N pieces of setting information, which is a part of the L pieces of setting information; information group supply processing of supplying an information group to the function execution apparatus, the information group including position information for reading out the N pieces of specific information stored in the memory and M pieces of relation information, where M is an integer of 1 or larger and smaller than L, and the M pieces of relation information relating to M pieces of setting information, which is different from the N pieces of setting information, among the L pieces of setting information; execution instruction information generation processing of reading out the N pieces of specific information from the memory in accordance with the position information in the information group and generating execution instruction information for instructing the function execution apparatus to execute predetermined processing when the information group is acquired from the function execution apparatus after the information group is supplied to the function execution apparatus, the execution instruction information including at least one piece of setting information among the L pieces of setting information, which includes the N pieces of setting information included in the N pieces of specific information and the M pieces of setting information relating to the M pieces of relation information in the information group; and execution instruction information supply processing of supplying the execution instruction information to the function execution apparatus.

According to still another illustrative embodiment of the present disclosure, there is provided a non-transitory computer readable recording medium storing computer readable instructions for a screen information server that is provided with a processor, wherein the instructions, when executed by the processor, causing the screen information server to perform: screen information supply processing of supplying a plurality of pieces of screen information to a function execution apparatus, the plurality of pieces of screen information representing a plurality of selection screens for enabling a user of the function execution apparatus to select setting information corresponding to a plurality of setting items relating to a specific service that is provided by a service providing server; setting information acquisition processing of acquiring L pieces of setting information, where L is an integer of 2 or larger, from the function execution apparatus, the L pieces of setting information including a plurality of setting information that is to be selected on a plurality of selection screens represented by the plurality of pieces of screen information by the user; registration processing of registering N pieces of specific information, where N is an integer of 1 or larger and smaller than L, in the memory, the N pieces of specific information including N pieces of setting information, which is a part of the L pieces of setting information; information group supply processing of supplying an information group to the function execution apparatus, the information group including position information for reading out the N pieces of specific information stored in the memory and M pieces of relation information, where M is an integer of 1 or larger and smaller than L, and the M pieces of relation information relating to M pieces of setting information, which is different from the N pieces of setting information, among the L pieces of setting information; execution instruction information generation processing of reading out the N pieces of specific information from the memory in accordance with the position information in the information group and generating execution instruction information for instructing the function execution apparatus to execute predetermined processing when the information group is acquired from the function execution apparatus after the information group is supplied to the function execution apparatus, the execution instruction information including at least one piece of setting information among the L pieces of setting information, which includes the N pieces of setting information included in the N pieces of specific information and the M pieces of setting information relating to the M pieces of relation information in the information group; and execution instruction information supply processing of supplying the execution instruction information to the function execution apparatus.

BRIEF DESCRIPTION OF THE DRAWINGS

In the accompanying drawings:

FIG. 2 shows an example of a display name table and a shortcut information storage area;

FIG. 18 is a table summarizing outlines of the respective cases.

DETAILED DESCRIPTION

Hereinafter, a function execution apparatus of an illustrative embodiment will be described in detail with reference to the accompanying drawings. In the illustrative embodiment, the present disclosure is applied to a multifunction device.

Figure 1:
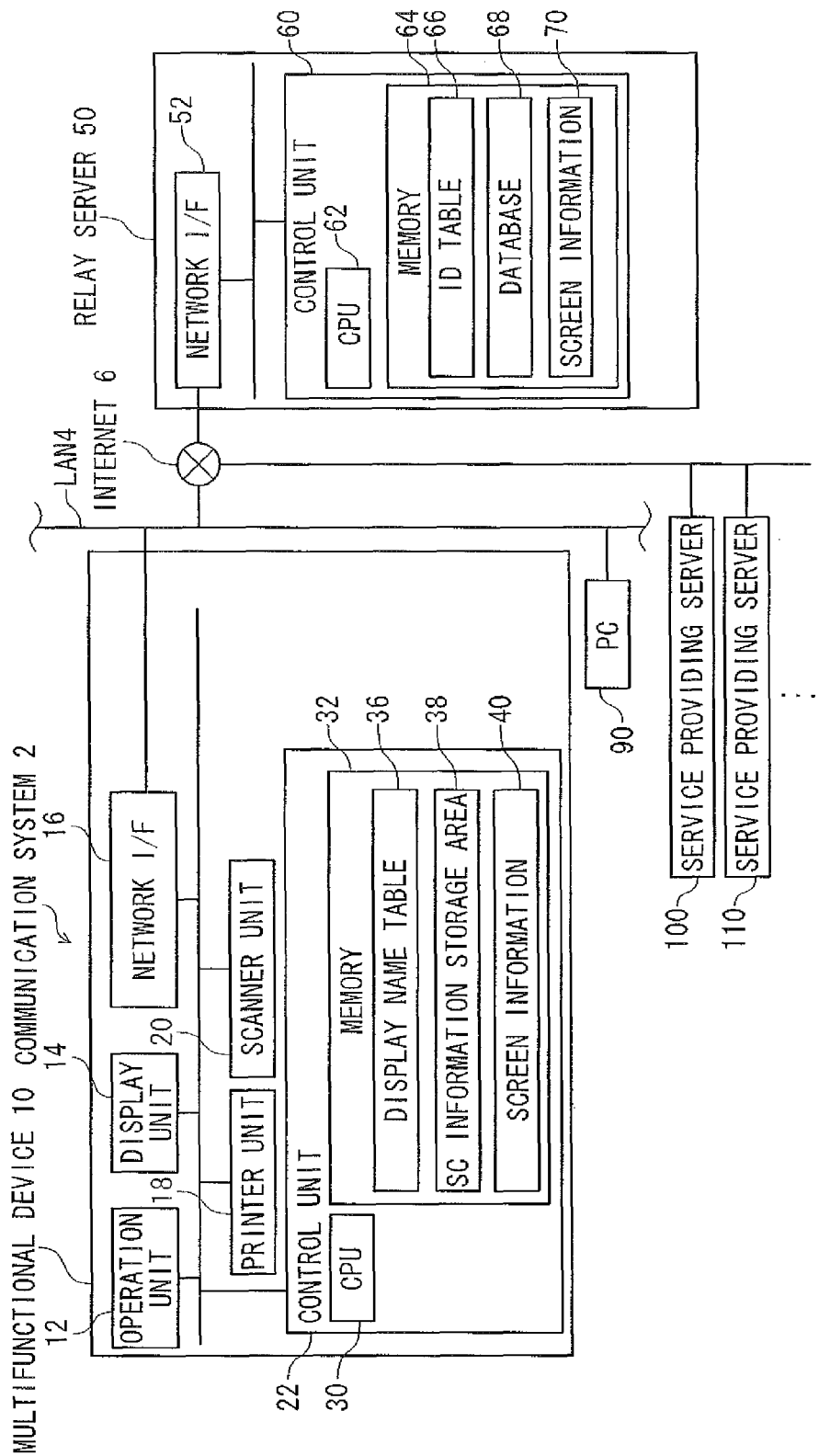
FIG. 1 shows a configuration of a communication system.

As shown in FIG. 1, a communication system 2 has a multifunctional device 10, a relay server 50, a PC (abbreviation of Personal Computer) 90, and a plurality of service providing servers 100, 110. The multifunctional device 10 and the PC 90 are connected to a LAN (abbreviation of Local Area Network) 4. The relay server 50 and the plurality of service providing servers 100, 110 are connected to the Internet 6.

The multifunctional device 10 is configured to execute a variety of functions such as a print function, a scan function, a copy function, a FAX function and the like. The multifunctional device 10 is capable of further executing a scan upload function (hereinafter, referred to as 'scan UL function') of uploading image data, which is generated as the multifunctional device 10 performs the scan function, to the service providing servers 100, 110. Also, the multifunctional device 10 is capable of further executing a download print function (hereinafter, referred to as 'DL print function') of downloading image data stored in the service providing servers 100, 110 and printing an image represented by the image data.

The multifunctional device 10 has an operation unit 12, a display unit 14, a network interface 16, a printer unit 18, a scanner unit 20 and a control unit 22. The operation unit 12 has a plurality of keys. A user can input a variety of instructions to the multifunctional device 10 by operating the operation unit 12. The display unit 14 is a display for displaying a variety of information. In a modified embodiment, the operation unit 12 and the display unit 14 may be integrally configured as a touch panel. That is, in a modified embodiment, the operation unit 12 and the display unit 14 may be configured as single hardware. The network interface 16 is connected to the LAN 4. The printer unit 18 is a print mechanism such as an inkjet type, a laser type and the like. The scanner unit 20 is a scan mechanism such as a CCD (abbreviation of Charge Coupled Disarmament), a CIS (abbreviation of Contact Image Sensor) and the like. The operation unit 12 is an example of a user interface.

The control unit 22 has a CPU 30 and a memory 32. The CPU 30 is configured to execute a variety of processing, in response to programs stored in the memory 32. The memory 32 is configured to therein a display name table 36, in addition to the programs. As shown in FIG. 2, the display name table 36 is a table for storing information in which a display name, a server name, an access token and a PIN code are associated with each other. The control unit 22 or the CPU 30 may be an example of a control unit or a processor.

The memory 32 further has a shortcut information storage area 38. The shortcut may also be referred to as 'SC'. As shown in FIG. 2, in the SC information storage area 38, a plurality of SC information 38a, 38b, 38c may be stored. Each of the shortcut information 38a, 38, 38c includes an SC name (for example, 'SC1', 'SC2', 'SC3').

The memory 32 is also configured to store therein each screen information 40 representing each screen (refer to screens 300 to 306 shown in FIG. 7, which will be described later) relating to the scan function that can be executed by the multifunctional device 10. Each of the screen information 40 is stored in advance in the memory 32 by a vendor of the multifunctional device 10.

The relay server 50 is a server for relaying provision of a service from the service providing servers 100, 110 to the multifunctional device 10. The relay server 50 is a server that is provided by the vendor of the multifunctional device 10. The relay server 50 has a network interface 52 and a control unit 60. The network interface 52 is connected to the Internet 6.

Figure 3:
FIG. 3 shows an example of an ID table.
Figure 4:
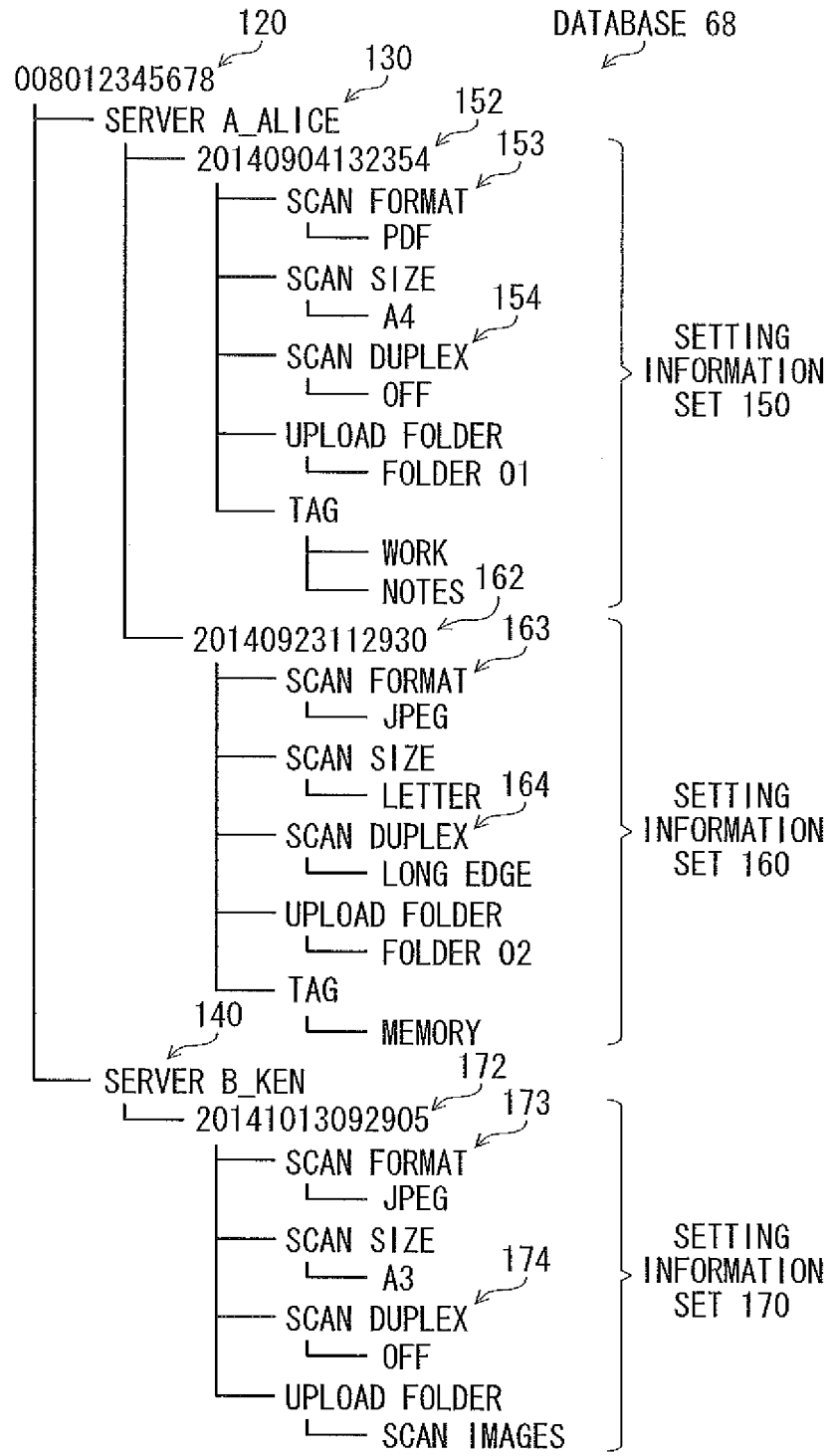
FIG. 4 shows an example of a database.

The control unit 60 has a CPU 62 and a memory 64. The CPU 62 is configured to execute a variety of processing, in response to programs stored in the memory 64. The memory 64 is also configured to store therein an ID (abbreviation of Identification Data) table 66 and a database 68, in addition to the programs. The ID table 66 is stored in advance in the memory 64 by the vendor of the multifunctional device 10. As shown in FIG. 3, the ID table 66 includes an information type table for storing information in which a character string indicating an information type and an ID are associated with each other, a function table for storing information in which a character string indicating a function and an ID are associated with each other, and a server name table for storing information in which a character string indicating a server name and an ID are associated with each other. Also, as shown in FIG. 4, the database 68 includes a plurality of setting information sets 150, 160, 170 acquired from the multifunctional device 10.

The memory 64 further includes each screen information 70 representing each screen information, (refer to screens 400 to 416 shown in FIG. 8, which will be described later) relating to the scan UL function. Each screen information 70 is stored in advance in the memory 64 by the vendor of the multifunctional device 10.

Each of the service providing servers 100, 110 is a well-known cloud server such as 'Evernote (registered trademark of Evernote Corporation)', 'Google Drive (registered trademark of Google. Inc.)', 'PICASA (registered trademark of Lifescape, Inc.)', 'FACEBOOK (registered trademark of Facebook, Inc.)' and the like. In this illustrative embodiment, it is assumed that a server name of the service providing server 100 is 'Server A' (for example, 'Evernote (registered trademark of Evernote Corporation)') and a server name of the service providing server 110 is 'Server B' (for example, 'Google Drive (registered trademark of Google. Inc.)').

Each of the service providing servers 100, 110 can provide a service to a variety of communication devices including the multifunctional device 10. For example, each of the service providing servers 100, 110 can execute an image storage service for storing image data acquired from the multifunctional apparatus 10 so that the multifunctional device 10 can execute the scan UL function. Also, for example, each of the service providing servers 100, 110 can execute an image supply service for supplying image data to the multifunctional apparatus 10 so that the multifunctional device 10 can execute the DL print function.

In the meantime, the service providing server 100 is a server that is provided by a first service provider (i.e., a first company), and the service providing server 110 is a server that is provided by a second service provider (i.e., a second company) different from the first service provider. The first service provider discloses a first API (Application Program Interface) for receiving a service from the service providing server 100, and the second service provider discloses a second API for receiving a service from the service providing server 110. Since the first service provider and the second service provider are different, the first API and the second API are usually different from each other. It is necessary for the communication device to correspond to both the first and second APIs so as to get the services from both the service providing servers 100, 110 (i.e., both a program for using the first API and a program for using the second API are required).

For example, in order for the multifunctional device 10 to receive services from the plurality of service providing servers 100, 110, the multifunctional device 10 should correspond to a plurality of APIs and thus store many programs. However, a storage capacity of the memory 32 of the multifunctional device 10 is smaller, compared to a PC and the like. Therefore, in this illustrative embodiment, the relay server 50 is provided so that the multifunctional device 10 can receive services from the plurality of service providing servers 100, 110 without storing many programs in the multifunctional device 10. That is, the relay server 50 corresponds to a plurality of APIs for the plurality of service providing servers 100, 110. In a situation where the multifunctional device 10 should get a service from a specific service providing server (for example, service providing server 100) of the plurality of service providing servers 100, 110, the relay server 50 uses an API for the specific service providing server to perform various communications (which will be described later) with the specific service providing server. Thereby, the multifunctional device 10 can perform communication of the image data with the specific service providing server without corresponding to the API for the specific service providing server. That is, the multifunctional device 10 can get the services from the respective service providing servers 100, 110 even though it does not store therein many programs for using a plurality of APIs.

A user of the multifunctional device 10 (hereinafter, referred to as 'user') should execute the following advanced preparation so that the multifunctional device 10 can receive services from the service providing server 100, 110. For example, the user uses the PC 90 to access the relay server 50. Then, the user registers a display name (for example, 'Alice') and a PIN code (for example, '1234') in the service providing server 100 having a server name 'Server A' through the relay server 50.

In this case, the relay server 50 acquires an access token (more generally, 'authentication information'; for example, 'XXXXXXXX') from the service providing server 100. Then, the relay server 50 generates a temporary ID and transmits the temporary ID to the PC 90. Thereby, the temporary ID is displayed on the PC 90. The user can know the temporary ID displayed on the PC 90.

Then, the user inputs, to the multifunctional device 10, the server name (for example, 'Server A') of the service providing server 100, the display name (for example, 'Alice') registered in the service providing server 100, and the PIN code (for example, '1234') registered in the service providing server 100 by operating the operation unit 12 of the multifunctional device 10. The user further inputs the temporary ID to the multifunctional device 10 by operating the operation unit 12 of the multifunctional device 10. In this case, the multifunctional device 10 transmits the temporary ID to the relay server 50. Thereby, the relay server 50 transmits the access token (for example, 'XXXXXXXX') to the multifunctional device 10.

When the respective processing is executed, the multifunctional device 10 is able to the information in the display name table 36 (refer to FIG. 2). In the above example, the multifunctional device 10 stores, in the display name table 36, the information in which the display name (for example 'Alice') input by the user, the server name (for example, 'Server A') input by the user, the access token (for example, 'XXXXXXXX') acquired from the relay server 50, and the PIN code (for example, '1234') input by the user are associated. In the meantime, the user can register the display name (for example, 'Alice') and the PIN code (for example, '3456') in the service providing server 110, too. In this case, the multifunctional device 10 stores new information (for example 'Alice', 'Server B', 'ZZZZZZZZ', '3456') in the display name table 36.

Figure 5:
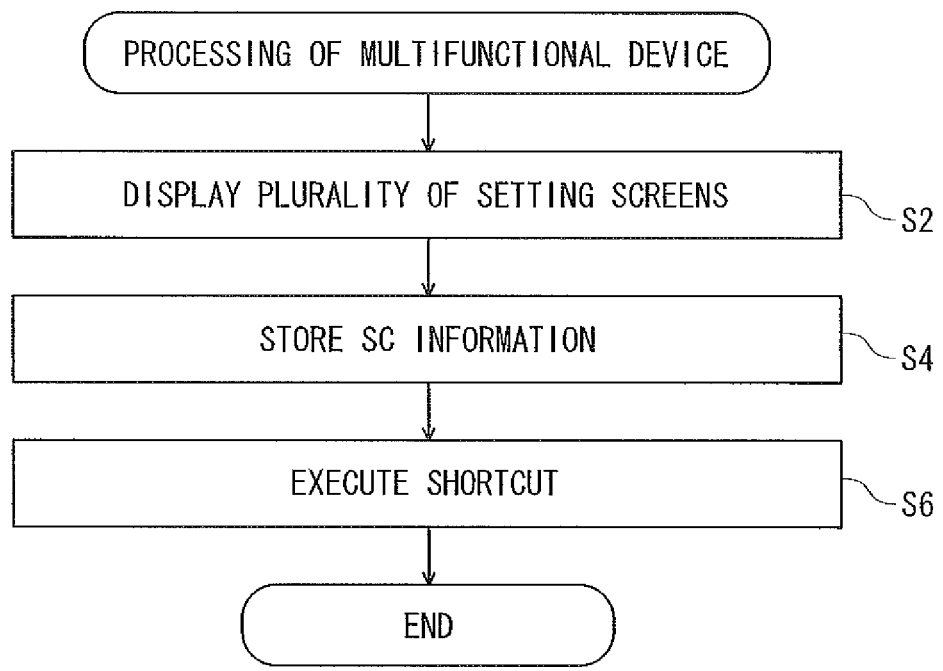
FIG. 5 shows a flowchart of processing that is to be executed by a multifunctional apparatus.

An outline of processing that is to be executed by the CPU 30 of the multifunctional device 10 is described with reference to FIG. 5. The CPU 30 is configured to execute respective processing in order of display of a plurality of setting screens (S2), storing of the SC information (S4) and execution of the shortcut (S6).

In S2, the CPU 30 sequentially displays a plurality of setting screens on the display unit 14. The user can select each setting information (for example, a server name, a display name, a function, a format, a scan profile and the like) on each setting screen displayed on the display unit 14. Then, the CPU 30 supplies each setting information selected by the user to the relay server 50 (cases A1, A2, B1 and C1; refer to FIGS. 6, 10, 13 and 16).

In S4, the CPU 30 stores the SC information associated with each setting information in the SC information storage area 38 (cases A1, A2, B1 and C1; refer to FIGS. 6, 10, 13 and 16).

In S6, as the user selects the SC information in the memory 32 by operating the operation unit 12, the CPU 30 executes a predetermined function (scan UL, scan, and the like) by using the setting information corresponding to the SC information (cases A3, B2 and C2; refer to FIGS. 11, 14, 15 and 17).

Subsequently, a case A1 for executing SC registration for executing the scan UL function is described with reference to FIG. 6. Although not shown, the CPU 30 of the multifunctional device 10 is configured to display a main screen 300 (FIG. 7) on the display unit 14 by using main screen information of the plurality of pieces of screen information 40 stored in advance in the memory 32. The main screen 300 includes a plurality of buttons (for example, 'Web', 'Shortcut', 'Scan', 'Copy', 'Fax' and the like) indicating a plurality of functions to be selected by the user.

In S10, when the user wants to register the SC information in the multifunctional device 10, the user selects a button 'Shortcut' included in the main screen 300 by operating the operation unit 12. In this case, the CPU 30 displays a shortcut screen 302 (FIG. 7) on the display unit 14 by using shortcut screen information of the plurality of pieces of screen information 40. The shortcut screen 302 includes a button (for example, 'SC0') indicating an SC name corresponding to the SC information stored already in the memory 32 and a button (i.e., 'add') indicating a new addition of the shortcut.

In S11, the user selects the button (i.e., 'add') included in the shortcut screen 302 by operating the operation unit 12. In this case, the CPU 30 displays a registration function screen 304 (FIG. 7) on the display unit 14 by using function selection screen information of the plurality of pieces of screen information 40. The registration function screen 304 includes a plurality of buttons (for example, 'Web', 'Scan', 'Copy', 'Fax' and the like) indicating a plurality of functions to be selected by the user.

In S12, the user selects the button 'Web' included in the registration function screen 304 by operating the operation unit 12. In this case, in S14, the CPU 30 supplies a registration instruction to the relay server 50.

When the registration instruction is acquired from the multifunctional device 10, the CPU 62 of the relay server 50 supplies server name screen information of the plurality of pieces of screen information 70 stored in the memory 64 to the multifunctional device 10, in S16.

When the server name screen information is acquired from the relay server 50, the CPU 30 of the multifunctional device 10 displays a server name screen 400 (FIG. 8) represented by the server name screen information on the display unit 14. The server name screen 400 includes one or more buttons (for example, 'Server A', 'Server B') indicating the server names of the one or more service providing servers 100, 110. In S18, the user selects a button 'Server A' (i.e., the server name of the service providing server 100) included in the server name screen 400 by operating the operation unit 12. In this case, in S20, the CPU 30 supplies the server name information indicating the server name 'Server A' and the display name table 36 in the memory 32 to the relay server 50. Specifically, in S20, actually, the CPU 30 first supplies the server name information to the relay server 50, and then supplies the display name table 36 to the relay server 50, in response to a request from the relay server 50. The server name information includes item information 'Server Name' indicating a setting item corresponding to the server name screen 400 and the setting information 'Server A' selected by the user (i.e., 'Server Name=Server A').

When the server name information and the display name table 36 are acquired from the multifunctional device 10, the CPU 62 of the relay server 50 specifies one or more display names (for example, 'Alice' and 'Ken' in FIG. 2) associated with the server name 'Server A' acquired in S20, from the display name table 36. Then, the CPU 62 writes the specified display names (for example, 'Alice' and 'Ken') in the display name screen information of the plurality of pieces of screen information 70. Subsequently, in S22, the CPU 62 supplies the display name screen information in which the one or more display names are written to the multifunctional device 10.

When the display name screen information is acquired from the relay server 50, the CPU 30 of the multifunctional device 10 displays a display name screen 402 (FIG. 8) represented by the display name screen information on the display unit 14. The display name screen 402 includes the one or more buttons (for example, 'Alice', 'Ken') indicating the one or more display names. In S24, the user selects a button 'Alice' included in the display name screen 402 by operating the operation unit 12. In this case, in S26, the CPU 30 supplies display name information indicating the display name 'Alice' to the relay server 50. The display name information includes item information 'Display Name' indicating the setting item corresponding to the display name screen 402, and the setting information 'Alice' selected by the user.

When the display name information is acquired from the multifunctional device 10, the CPU 62 of the relay server 50 supplies function screen information of the plurality of pieces of screen information 70 to the multifunctional device 10, in S28.

When the function screen information is acquired from the relay server 50, the CPU 30 of the multifunctional device 10 displays a function screen 404 (FIG. 8) represented by the function screen information on the display unit 14. The function screen 404 includes a button 'Scan Upload' indicating the scan UL function, and a button 'Download Print' indicating the DL print function. In S30, the user selects the button 'Scan Upload' included in the function screen 404 by operating the operation unit 12. In this case, in S32, the CPU 30 supplies function information indicating the function 'Scan Upload' to the relay server 50. The function information includes item information 'Function' indicating a setting item corresponding to the function screen 404, and the setting information 'Scan Upload' selected by the user.

When the function information is acquired from the multifunctional device 10, the CPU 62 of the relay server 50 supplies format screen information of the plurality of pieces of screen information 70 to the multifunctional device 10, in S34.

When the format screen information is acquired from the relay server 50, the CPU 30 of the multifunctional device 10 displays a format screen 406 (FIG. 8) represented by the format screen information on the display unit 14. The format screen 406 includes a plurality of buttons (for example, 'PDF', 'JPEG', 'DOC' and the like) indicating a plurality of formats and a registration button 406a for issuing a generation instruction of the shortcut. In S36, the user selects a button 'PDF' indicating a format PDF by operating the operation unit 12. In this case, in S38, the CPU 30 supplies format information indicating the format 'PDF' to the relay server 50. The format information includes item information 'Format' indicating a setting item corresponding to the format screen 406 and the setting information 'PDF' selected by the user.

When the format information is acquired from the multifunctional device 10, the CPU 62 of the relay server 50 supplies profile screen information of the plurality of pieces of screen information 70 to the multifunctional device 10, in S40.

When the profile screen information is acquired from the relay server 50, the CPU 30 of the multifunctional device 10 displays a profile screen 408 (FIG. 8) represented by the profile screen information on the display unit 14. The profile screen 408 includes a field 408a for selecting a size of a document to be scanned (i.e., Scan size; for example, 'A4' and the like), a field 408b for selecting a storage destination folder (i.e., folder; for example 'Folder 01' and the like) of scan data, a field 408c for selecting whether or not to perform a duplex scan (i.e., Scan Duplex; for example, 'OFF'), a field 408d for selecting whether or not to generate a shortcut (i.e., Make Shortcut; 'YES' or 'NO'), and the like. When the user selects the respective fields 408a to 408d by operating the operation unit 12, list of settings to be selectable in the respective fields 408a to 408d are displayed. The user can select desired settings from the displayed lists.

In the case A1, since the 'add' button is selected on the shortcut screen 302 (refer to FIG. 7) (S11) before the profile screen 408 is displayed, the field 408d for selecting whether or not to generate a shortcut is set so that it cannot be changed from 'YES' state on the profile screen 408. In a modified embodiment, regarding this case, the field 408d may not be displayed in the profile screen 408.

Also, in the case A1, the server name 'Server A' is selected on the server name screen 400 (S18). Here, in the illustrative embodiment, the service providing server 100 indicated by the server name 'Server A' corresponds to a profile relating to a tag. For this reason, although not shown, the profile screen 408 of the case A1 also includes a field for selecting a tag, too, in addition to the respective fields 408a to 408d. Meanwhile, in the illustrative embodiment, the service providing server 100 indicated by the server name 'Server B' does not correspond to a profile relating to a tag. For this reason, in a case (case B1; refer to FIG. 13) where the server name 'Server B' is selected on the server name screen 400, the profile screen 408 does not include a field for selecting a tag.

In S42, after inputting the desired setting information in the respective fields 408a to 408d, the user selects an OK button 408e. For example, the user inputs the respective setting information of the scan size 'A4', the duplex scan 'OFF', the storage destination folder 'Folder 01', the shortcut generation 'YES' and the tag 'Work, Notes' on the profile screen 408. In this case, in S44, the CPU 30 of the multifunctional device 10 supplies a scan profile including the respective setting information input on the profile screen 408 to the relay server 50. The scan profile includes the plurality of item information (for example, 'Scan Size', 'Duplex Scan', 'Upload Folder', 'Make Shortcut', 'Tag') corresponding to the profile screen 408 and the setting information (for example, 'A4', 'OFF', 'Folder01', 'YES', 'Work, Notes') selected by the user.

When the scan profile is acquired from the multifunctional device 10, the CPU 62 of the relay server 50 writes the respective information (for example, 'Display Name=Alice', 'Server Name=Server A', 'Function=Scan Upload', 'Format=PDF', 'Scan Size=A4' and the like) acquired from the multifunctional device 10 in confirmation screen information of the plurality of pieces of screen information 70. Subsequently, in S46, the CPU 62 supplies the confirmation screen information having the respective information written therein to the multifunctional device 10.

When the confirmation screen information is acquired from the relay server 50, the CPU 30 of the multifunctional device 10 displays a confirmation screen 414 (FIG. 8) represented by the confirmation screen information on the display unit 14. The confirmation screen 414 includes a message (for example, 'Registration OK?') for asking the user whether or not to register the SC information, an OK button 414a for executing the registration, and an NG button 414b for cancelling the registration. In S48, the user selects the OK button 414a by operating the operation unit 12. In this case, in S50, the CPU 30 supplies the OK information to the relay server 50. In the meantime, although not shown, when the user selects the NG button 414b, the CPU 30 ends the processing without registering the SC information.

When the OK information is acquired from the multifunctional device 10, the CPU 62 of the relay server 50 supplies SC name input screen information of the plurality of pieces of screen information 70 to the multifunctional device 10, in S52.

When the SC name input screen information is acquired from the relay server 50, the CPU 30 of the multifunctional device 10 displays an SC name input screen 416 (FIG. 8) represented by the SC name input screen information on the display unit 14. The SC name input screen 416 includes an input field 416a for enabling the user to input a desired shortcut name (for example, 'SC1'), and an OK button 416b for determining the shortcut name input in the input field 416a. In S54, the user inputs the SC name 'SC1' in the input field 416a and selects the OK button 416b by operating the operation unit 12. In this case, in S56, the CPU 30 supplies SC name information indicating the SC name 'SC1' to the relay server 50.

When the SC name information is acquired from the multifunctional device 10, the CPU 62 of the relay server 50 generates a setting ID (for example, '20140904132354'), in S58. The setting ID is a unique ID that is generated using date and time, for example.

Figure 9:
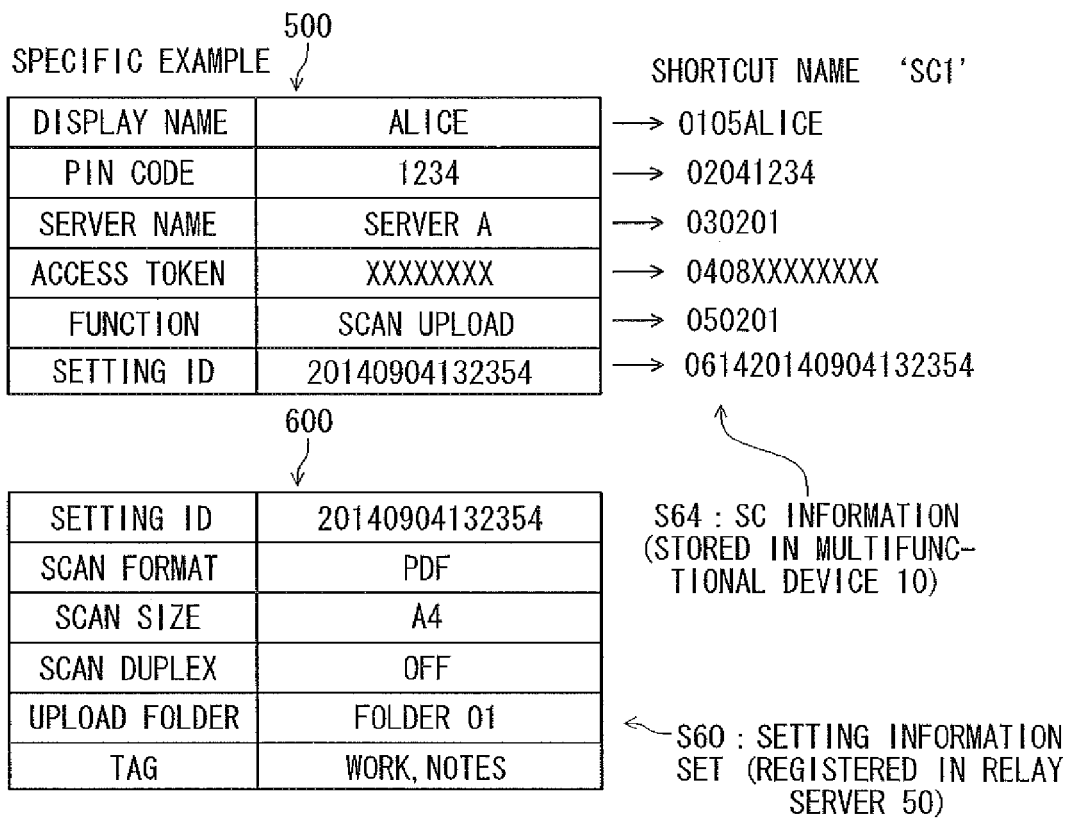
FIG. 9 shows a specific example of shortcut information and a setting information set.

Then, the CPU 62 generates a setting information set on the basis of the setting ID generated in S58, the format information acquired in S38 and the scan profile acquired in S44. Specifically, the CPU 62 generates a setting information set indicated in the following 600 of FIG. 9. At this time, the CPU 62 associates the item information 'Setting ID' with the setting ID generated in S58. The setting information set indicated in the table 600 includes 'Setting ID=20140904132354', 'Scan Format=PDF', 'Scan Size=A4', 'Scan Duplex=OFF', 'Upload Folder=Folder01', and 'Tag=Work, Notes'.

In S60, the CPU 62 stores (i.e., registers) the generated setting information set in the database 68 of the memory 64. At this time, the CPU 62 associates the setting information set with a device ID '008012345678' (refer to a reference numeral 120 in FIG. 4) of the multifunctional device 10 and combination information 'Server A_Alice' (refer to a reference numeral 130 in FIG. 4) and registers the same in the database 68. As a result, the setting information set 150 of FIG. 4 is registered in the database 68.

As shown in FIG. 4, in the database 68, the combination information 130, 140 of the server name and the display name is stored and associated with the device ID 120 of the multifunctional device 10. The setting information sets 150, 160 are associated with the combination information 130, and the setting information set 170 is associated with the combination information 140. For this reason, when a manager of the relay server 50 edits the respective setting information sets in the database 68, the manager can edit (for example, delete) the information for each device ID or combination information.

As described above, the setting information set 150 includes the setting ID 152 (i.e., '20140904132354'), the format information 153 (i.e., 'Scan Format=PDF'), and the scan profile 154 (i.e., 'Scan Size=A4', 'Scan Duplex=OFF', 'Upload Folder=Folder 01', 'Tag=Work, Notes'). The scan profile 154 includes a plurality of profiles (for example, 'Scan Size=A4' and the like).

Likewise, the setting information set 160 also includes the setting ID 162 (i.e., '20140923112930'), the format information 163 (i.e., 'Scan Format=JPEG'), and the scan profile 164 (i.e., 'Scan Size=Letter', 'Scan Duplex=LongEdge', 'Upload Folder=Folder 02', 'Tag=Memory'). The setting information sets 150, 160 are associated with the combination information (i.e., 'ServerA_Alice') 130. That is, the servers of the service provision sources corresponding to the setting information sets 150, 160 are both in the service providing server 100. For this reason, the format information 153, 163 and the respective item information (for example, 'Scan Format', 'Scan Size', 'Scan Duplex' and the like) included in the scan profiles 154, 164 are common.

Also, the setting information set 170 includes the setting ID 172 (i.e., '201410130922905'), the format information 173 (i.e., 'Scan Format=JPEG'), and the scan profile 174 (i.e., 'Scan Size=A3', 'Scan Duplex=OFF', 'Upload Folder=Scan Image'). The setting information set 170 is associated with the combination information 140. That is, the server of the service provision source corresponding to the setting information set 170 is the service providing server 110. As described above, the service providing server 110 does not correspond to the profile relating to a tag. For this reason, the scan profile 174 does not include the item information 'Tag'.

Then, in S62, the CPU 62 generates the SC information on the basis of the server information acquired from the multifunctional device 10 in S20, the acquired display name table 36, the display name information acquired from the multifunctional device 10 in S26, the function information acquired in S32, and the setting ID generated in S58. Specifically, the CPU 62 first symbolizes six pieces of information indicated in a table 500 of FIG. 9 and generates six pieces of symbolic six symbol information by referring to the ID table 66. The six pieces of information indicated in the table 500 includes 'Display Name=Alice', 'PIN Code=1234', 'Server Name=Server A', 'Access Token=XXXXXX', 'Function=Scan Upload', and 'Setting ID=20140904132354'.

The method of generating six pieces of symbolic information in S62 is described next. The CPU 62 specifies an ID '01' corresponding to 'Display Name' in the table 500 from the information type table included in the ID table 66 (FIG. 3). Then, the CPU 62 generates the symbolic information '0105Alice' indicating a combination of the ID '01' corresponding to 'Display Name', a data size (bytes) '05' of 'Alice' and 'Alice'. In the meantime, the display name 'Alice' may be expressed in a normal character string such as 'Display Name=Alice'. However, when the display name 'Alice' is expressed by the symbolic information '0105Alice', like this illustrative embodiment, it is possible to reduce a data amount.

Like the display name, the CPU 62 creates symbolic information, for other information as well. The CPU 62 may generate the symbolic information '02041234', instead of expressing the normal character string such as 'PIN Code=1234'. Also, the CPU 62 specifies an ID '03' corresponding to 'Server Name' from the information type table of FIG. 3 and specifies an ID '01' corresponding to 'Server A' from the server name table of FIG. 3. Then, the CPU 62 may generate the symbolic information '030201' indicating a combination of the ID '03' corresponding to 'Server Name', a data size (bytes) '02' of the ID '01' corresponding to 'Server A' and the ID '01' corresponding to 'Server A', instead of expressing the normal character string such as 'Server Name=Server A'.

Also, the CPU 62 may generate symbolic information '0408 XXXXXXXX', instead of expressing the normal character string such as 'Access Token=XXXXXXXX.' Also, the CPU 62 specifies an ID '05' corresponding to 'Function' from the information type table, and specifies an ID '01' corresponding to 'Scan Upload' from the function table. Then, the CPU 62 may generate the symbolic information '050201' indicating a combination of the ID '05' corresponding to 'Function', a data size (bytes) '02' of the ID '01' corresponding to 'Scan Upload' and the ID '01' corresponding to 'Scan Upload', instead of expressing the normal character string such as 'Function=Scan Upload'. Also, the CPU 62 may generate the symbolic information '061420140904132354', instead of expressing the normal character string such as 'Setting ID=20140904132354'.

As described above, the CPU 62 can generate the respective symbolic information (for example, '0105Alice') having a smaller data amount than the normal character string (for example, 'Display Name=Alice') by using the ID table 66. In the meantime, the CPU 62 also can generate (i.e., reproduce) each character string (for example, 'Display Name=Alice') from each piece of symbolic information (for example, '0105Alice') by using the ID table 66.

The six pieces of symbolic information generated by the above method includes '0105Alice', '02041234', '030201', '0408XXXXXXXX', '050201', and '061420140904132354'.

Then, the CPU 62 generates the SC information including the six generated pieces of symbolic information and the SC name 'SC1' acquired from the multifunctional device 10 in S56. Then, in S64, the CPU 62 supplies the generated SC information to the multifunctional device 10.

When the SC information is acquired from the relay server 50, the CPU 30 of the multifunctional device 10 stores the acquired SC information in the SC information storage area 38 of the memory 32 in S66. As a result, SC information 38*a* of FIG. 2 is stored in the SC information storage area 38. Thereby, the shortcut registration for executing the scan UL function is completed. In the following, the SC information (for example, the SC information including the SC name 'SC1') including the six pieces of symbolic information corresponding to the display name, the PIN code, the server name, the access token, the function and the setting ID may also be referred to as 'first type SC information'.

As described above, in the case A1, the CPU 30 of the multifunctional device 10 stores the first type SC information including the six pieces of symbolic information, in which the respective information such as the server name information, the display name information and the like are symbolic, in the memory 32, instead of storing the respective information such as the server name information, the display name information and the like in the memory 32. For this reason, as compared to a configuration where the respective information such as the server name information, the display name information and the like are stored without being symbolic, the information to be stored in the memory 32 of the multifunctional device 10 is reduced.

Further, the first type SC information does not include the symbolic information in which the format information and the scan profile are symbolic. Instead of the symbolic information in which the format information and the scan profile are symbolized, the CPU 32 includes the symbolic information having the symbolized setting ID in the first type SC information and stores the same in the memory 32. For this reason, as compared to a configuration where the format information and the symbolic information having the symbolized scan profile are additionally stored, the information to be stored in the memory 32 of the multifunctional device 10 is reduced.

Also, as described above, the setting information set 150 and the like stored in the database 68 of the memory 64 of the relay server 50 do not include the PIN code and the access token. The PIN code and the access token are symbolized and included in the first type SC information, which is then stored in the memory 32 of the multifunctional device 10. There is a possibility that the PIN code and the access token are important to the user. Since the PIN code and the access token, which may be important to the user, are not registered in the relay server 50, it is possible to increase the security.

Subsequently, a case A2 for executing the SC registration after executing the scan UL function is described with reference to FIG. 10. In the illustrative embodiment, in order to execute the SC registration, the SC registration can also be made upon the execution of the scan UL function, in addition to the case A1.

Figure 7:
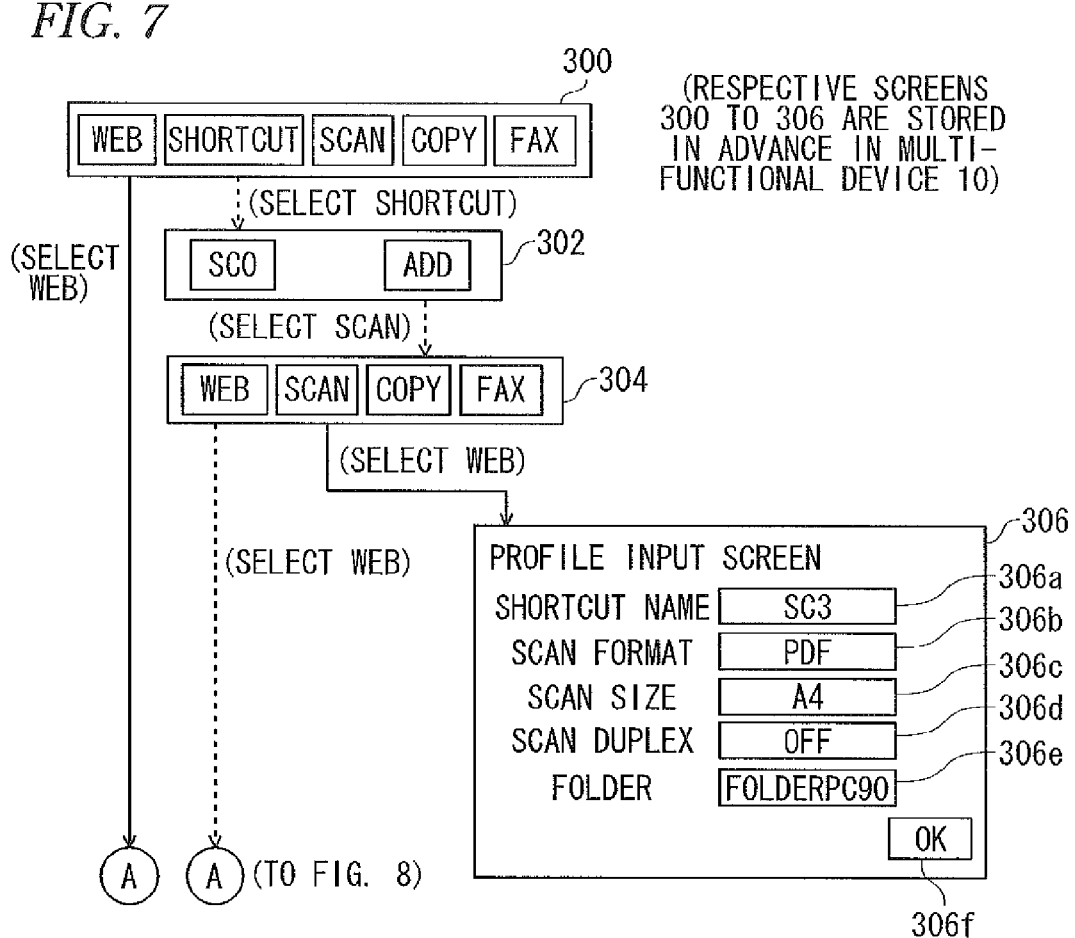
FIG. 7 illustrates each screen stored in advance in the multifunctional apparatus.

In S80, the user selects the button 'Web' on the main screen 300 of FIG. 7. In S82, the CPU 30 of the multifunctional device 10 supplies a Web execution instruction to the relay server 50.

Figure 6:
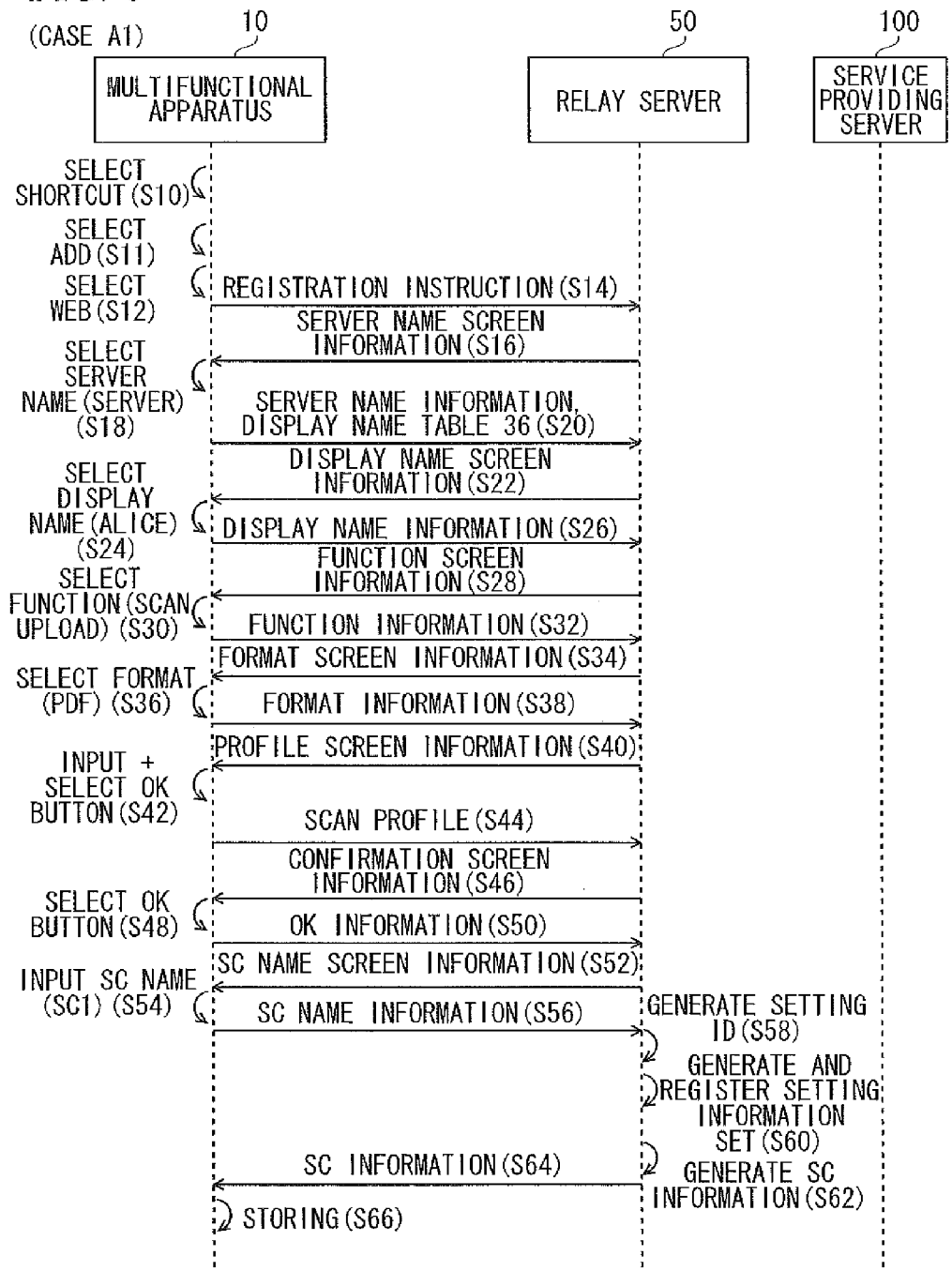
FIG. 6 is a sequence diagram of a case A1 for executing shortcut registration.

At this time, the same processing as S16 to S42 of FIG. 6 is executed between the CPU 30 of the multifunctional device 10 and the CPU 62 of the relay server 50. Meanwhile, in the case A2, since the shortcut screen 302 of FIG. 7 is not displayed on the display unit 14, the user can change the field 408 for selecting whether or not to generate the shortcut on the profile screen 408 of FIG. 8. Here, the user selects 'YES' in the field 408*d*.

In S110, the CPU 30 of the multifunctional device 10 supplies a scan profile including a plurality of profiles input on the profile screen 408 to the relay server 50.

When the scan profile is acquired from the multifunctional device 10, the CPU 62 of the relay server 50 supplies a scan upload instruction and screen information under execution of the plurality of pieces of screen information 70 in the memory 64 to the relay server 50. The scan upload instruction includes the respective information such as 'Display Name=Alice', 'PIN Code=1234' and the like (i.e., the information except for 'Setting ID=20140904132354' of the respective information included in the tables 500, 600 of the specific example shown in FIG. 9). In the following, the respective information included in the scan upload instruction may also be referred to as 'the setting information group'.

When the scan upload instruction and the screen information under execution are acquired, the CPU 30 of the multifunctional device 10 displays a screen under execution 410 (FIG. 8) expressed by the screen information under execution on the display unit 14. The screen under execution 410 includes a message (i.e., 'progressing') indicating that the scan UL function is being executed. In S114, the CPU 30 enables the scanner unit 20 to scan a document in accordance with the format and profiles included in the scan upload instruction. As a result, the image data is generated in accordance with the format and profiles included in the scan upload instruction. Then, in S116, the CPU 30 supplies an upload URL request to the relay server 50. An upload URL is a URL indicating a position in the service providing server 100, in which the image data generated by the scan should be stored.

When the upload URL request is acquired from the multifunctional device 10, the CPU 62 of the relay server 50 supplies an upload URL stored in advance in the memory 64 to the multifunctional device 10, in S118. In a modified embodiment, when the upload URL request is acquired from the multifunctional device 10, the CPU 62 may supply the upload URL request to the service providing server 100 and acquire the upload URL from the service providing server 100.

In the meantime, as described above, the CPU 62 of the relay server 50 acquires the display name table 36 from the multifunctional device 10 before supplying the display name screen information to the multifunctional device 10 (S22 in FIG. 6). Therefore, the CPU 62 can specify the access token 'XXXXXXXX' associated with the setting information 'Server A' included in the server name information (S20) and the setting information 'Alice' included in the display name information (S26), from the display name table 36. Then, the CPU 62 enables the service providing server 100 to perform authentication by using the access token 'XXXXXXXX' in the step (S116) of acquiring the upload URL request from the multifunctional device 10 or in the previous step thereof. Meanwhile, in the following, although the description of the authentication using the access token is omitted, the relay server 50 may enable the service providing server 100 to perform the authentication using the access token, as required (for example, whenever transmitting the request to the service providing server 100).

When the upload URL is acquired from the relay server 50, the CPU 30 of the multifunctional device 10 supplies an upload request including the acquired upload URL and the image data generated by the scan (S114) to the service providing server 100 (i.e., the server having the server name 'Server A') not via the relay server 50, in S120. In the illustrative embodiment, since the upload request is not transmitted via the relay server 50, it is possible to prevent a private image of the user from being transmitted via the relay server 50. On the other hand, in a modified embodiment, the image data may be uploaded to the service providing server 100 via the relay server 50. In the case, it is possible to upload the image data to the service providing server 100 with a simpler configuration.

When the upload request is acquired, the service providing server 100 stores the image data included in the upload request at a position indicated by the upload URL included in the upload request. That is, the execution of the scan UL function is completed. Then, in S122, the service providing server 100 supplies OK information, which indicates that the image data is normally stored (i.e., uploaded), to the multifunctional device 10.

When the OK information is acquired, the CPU 30 of the multifunctional device 10 supplies completion information, which indicates that the execution of the scan UL function has been completed, to the relay server 50 in S124.

When the completion information is acquired, the CPU 62 of the relay server 50 determines in S126 that a profile (i.e., 'Make shortcut=Yes') indicating generation of a shortcut is included in the scan profile acquired in S110.

Thereafter, the same processing as S46 to S66 of FIG. 6 is executed between the CPU 62 of the relay server 50 and the CPU 30 of the multifunctional device 10. As a result, like the case A1, the first type SC information is stored the memory 32.

As described above, in the case A2, the CPU 30 of the multifunctional device 10 can acquire the first type SC information from the relay server 50 and store the same in the memory 32 after executing the scan UL function in response to the user's instruction. That is, the CPU 30 can acquire the first type SC information, which relates to the setting information used for the execution of the scan UL function, from the relay server 50 and store the same in the memory 32. The multifunctional device 10 can appropriately store the first type SC information.

Also, as described above, when the user selects 'YES' in the shortcut generation selection field 408d on the profile screen 408, the multifunctional device 10 acquires and stores the SC information from the relay server 50, and when the user selects 'NO' in the selection field 408d, the multifunctional device 10 ends the processing without acquiring the SC information from the relay server 50. The multifunctional device 10 can change whether or not to store the SC information, in accordance with the user's intention.

Subsequently, a case A3 where the SC information of the SC name 'SC1', which is the first type SC information, is selected by the user is described with reference to FIG. 11.

Figure 12:
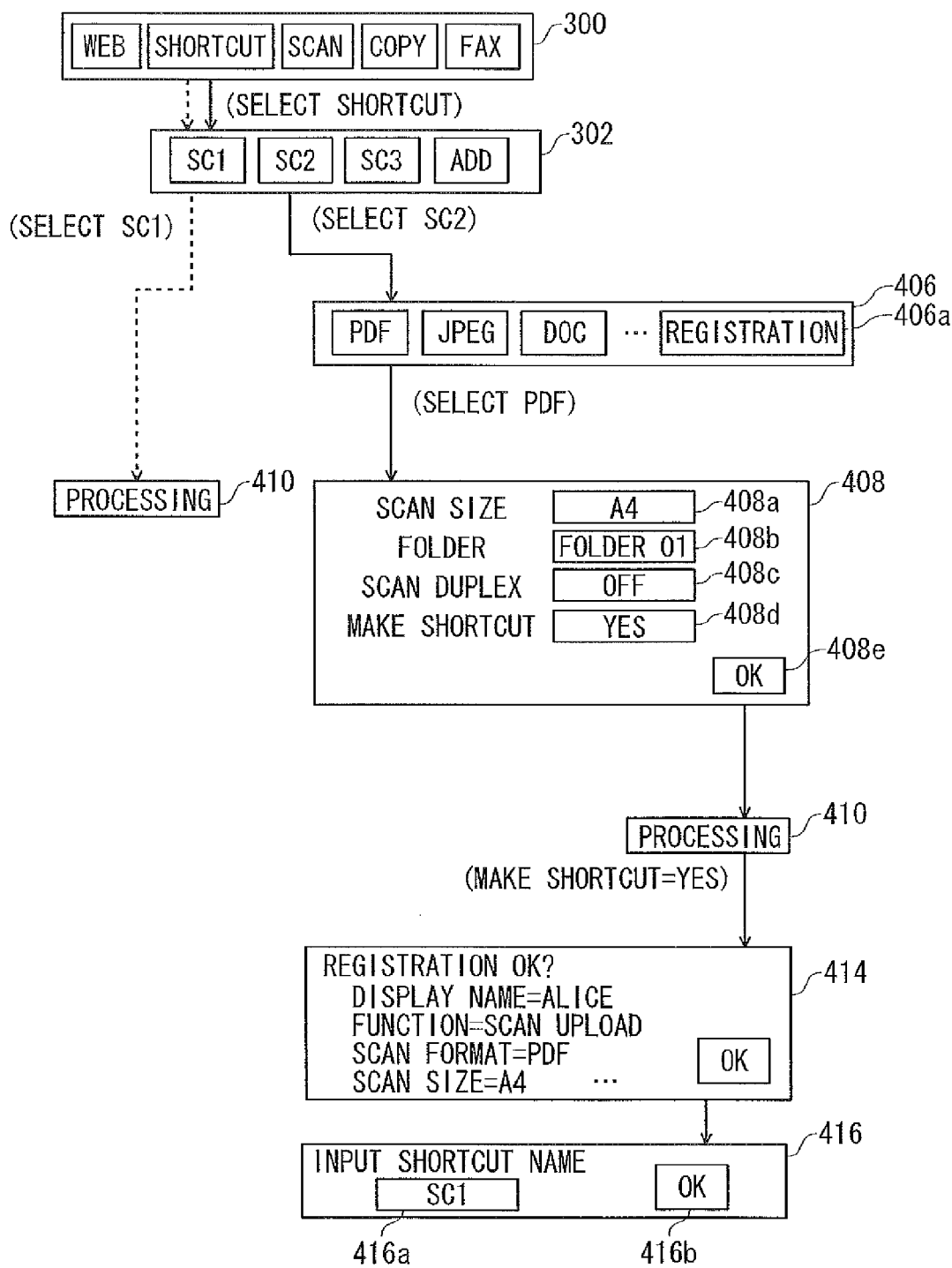
FIG. 12 illustrates each screen that is to be displayed in the multifunctional apparatus.

In S150, the user selects the button 'Shortcut' while the main screen 300 of FIG. 12 is displayed on the display unit 14 of the multifunctional device 10. In this case, the CPU 30 of the multifunctional device 10 displays the shortcut screen 302 of FIG. 12 on the display unit 14. In the case A3, the shortcut screen 302 includes buttons (i.e., 'SC1', 'SC2' and 'SC3') indicating the SC names corresponding to the SC information stored in the memory 32 at that time. Then, in S151, the user selects the button 'SC1' displayed in the shortcut screen 302. In this case, in S152, the CPU 30 supplies an SC execution instruction to instruct the execution of the shortcut to the relay server 50.

The CPU 62 of the relay server 50 acquires the SC execution instruction from the multifunctional device 10. In this case, in S154, the CPU 62 supplies an SC information request for requesting the SC information selected in the multifunctional device 10 to the multifunctional device 10.

When the SC information request is acquired, the CPU 30 of the multifunctional device 10 reads out the SC information including the SC name 'SC1' selected in S151 from the SC information storage area 38 of the memory 32, in S156. Then, in S158, the CPU 30 supplies the read SC information to the relay server 50.

When the SC information is acquired from the multifunctional device 10, the CPU 62 of the relay server 50 reproduces the six pieces of information from the six pieces of symbolic information included in the SC information in accordance with the ID table 66, in S162. The six pieces of information reproduced in S162 is a combination of the six item information and the six setting information. Specifically, the six pieces of information is the respective information of 'Display Name=Alice', 'PIN Code=1234', 'Server Name=Server A', 'Access Token=XXXXXXXX', 'Function=Scan Upload' and 'Setting ID=20140904132354' (refer to the table 900 of FIG. 9). Then, in S163, the CPU 62 specifies the setting information set 150 (refer to FIG. 4) including the setting ID '20140904132354' included in the information reproduced in S162 from the database 68 of the memory 64. Further, in S163, the CPU 62 reads out the specified setting information set 150 from the database 68.

Then, in S164, the CPU 62 reproduces the setting information group by combining the six pieces of information reproduced in S162 and the setting information set 150 read out in S163. The setting information group reproduced in S164 includes the six pieces of information reproduced in S162, the format information included in the setting information set 150 read out in S163 and the plurality of profiles 154. That is, the setting information group includes the respective information except for 'Setting ID=20140904132354' of the respective information included in the tables 500, 600 of FIG. 9. Then, in S112, CPU 62 supplies the scan upload instruction and the screen information under execution to the relay server 50.

Figure 10:
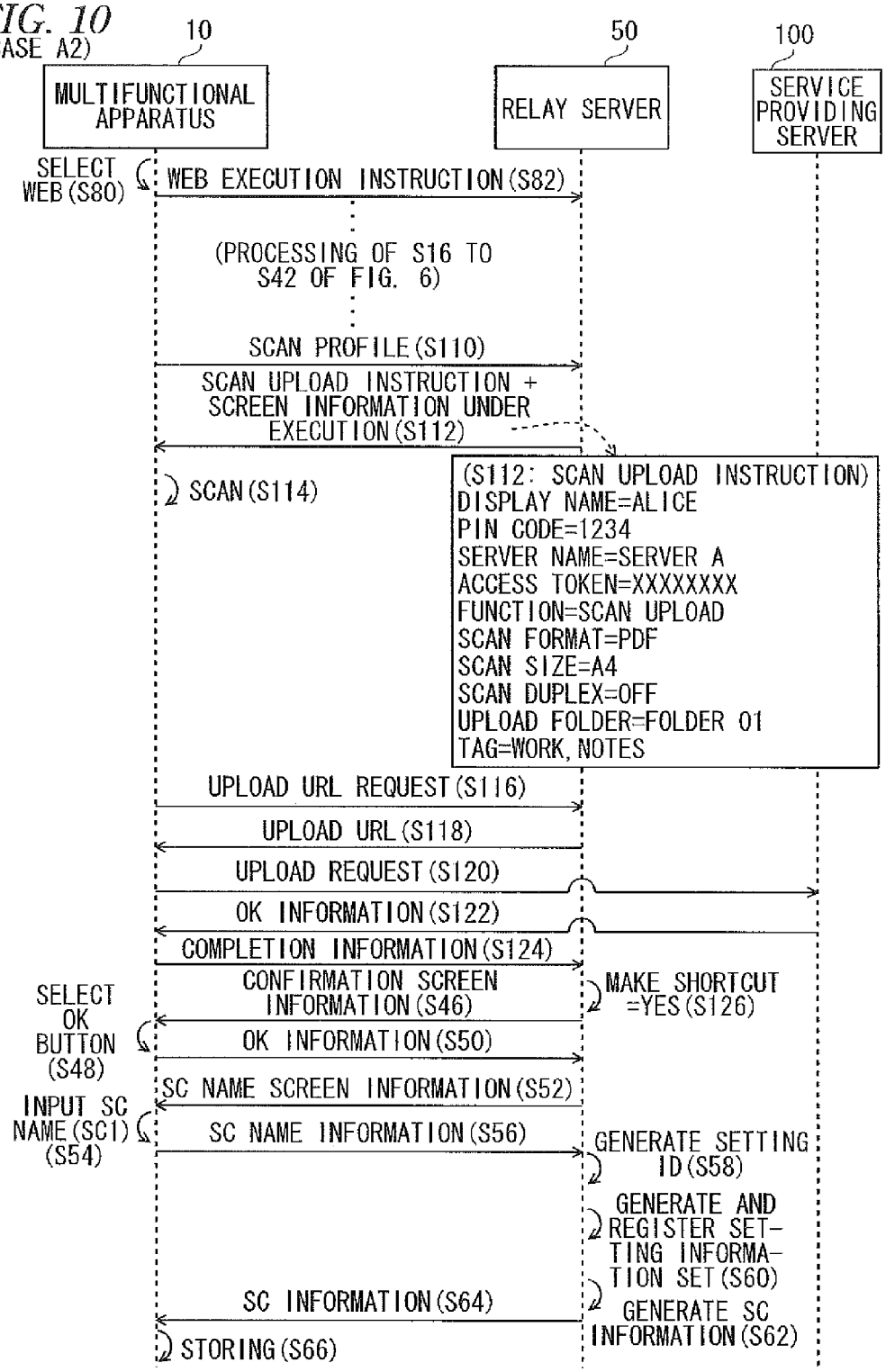
FIG. 10 is a sequence diagram of a case A2 for executing the shortcut registration after executing a scan upload function.

Thereafter, the same processing as S114 to S124 of FIG. 10 is executed between the CPU 30 of the multifunctional device 10 and the CPU 62 of the relay server 50. Thereby, the execution of the scan UL function is completed.

As described above, when the first type SC information is selected at the state where the first type SC information is stored in the memory 32, the CPU 30 of the multifunctional device 10 supplies the selected first type SC information to the relay server 50 (S158). Then, the CPU 30 acquires the scan upload instruction including the setting information group (S112). The CPU 30 executes the scan UL function by using the setting information (format, profiles and the like) included in the setting information group. That is, the user executes the operation of selecting the first type SC information at the state where the first type SC information is stored in the memory 32 of the multifunctional device 10, thereby enabling the multifunctional device 10 to execute the scan UL function by using the setting information included in the setting information group. After selecting the first type SC information, the user does not have to further select the profile. Therefore, in the illustrative embodiment, the user performs fewer input operations of information than the related art, so that the multifunctional device 10 can execute the scan UL function.

Meanwhile, in the illustrative embodiment, it may be possible to execute the SC registration by using the input information of the format information, as those disclosed in JP-A-2013-109730. A case B1 where the SC registration for executing the scan UL function is executed is described with reference to FIG. 13.

In S80, the user selects the button 'Web' while the main screen 300 of FIG. 7 is displayed on the display unit 14 of the multifunctional device 10. In this case, in S82, the CPU 30 of the multifunctional device 10 supplies a Web execution instruction to the relay server 50.

When a registration instruction is acquired from the multifunctional device 10, the CPU 62 of the relay server 50 supplies the server name screen information of the plurality of pieces of screen information 70 stored in the memory 64 to the multifunctional device 10, in S16.

Thereafter, the same processing as S18 to S34 of FIG. 6 is executed between the CPU 30 of the multifunctional device 10 and the CPU 62 of the relay server 50. Meanwhile, in the case B1, an example where the following contents are selected is described. In S18, the user selects the button 'Server B' (i.e., the server name of the service providing server 110) included in the server name screen 400 of FIG. 8. Also, in S24, the user selects the button 'Alice' included in the display name screen 402. Also, in S30, the user selects the button 'Scan Upload' included in the function screen 404.

When the format screen information (S34) is acquired from the relay server 50, the CPU 30 of the multifunctional device 10 displays the format screen 406 (FIG. 8) represented by the format screen information on the display unit 14. In S84, the user selects the registration button 406a. In this case, in S86, the CPU 30 supplies the registration instruction to the relay server 50.

When the registration instruction is acquired from the multifunctional device 10, the CPU 62 of the relay server 50 supplies the SC name input screen information of the plurality of pieces of screen information 70 to the multifunctional device 10, in S88.

When the SC name input screen information is acquired from the relay server 50, the CPU 30 of the multifunctional device 10 displays the SC name input screen 416 (FIG. 8) represented by the SC name input screen information on the display unit 14. In S90, the user inputs the SC name 'SC2' in the input field 416a and selects the OK button 416b by operating the operation unit 12. In this case, in S92, the CPU 30 supplies the SC name information, which indicates the SC name 'SC2' input in the input field 416a of the SC name input screen 416, to the relay server 50.

The CPU 62 of the relay server 50 acquires the SC name information from the multifunctional device 10. In S94, the CPU 62 generates the SC information on the basis of the server information acquired from the multifunctional device 10 in S20, the acquired display name table 36, the display name information acquired from the multifunctional device 10 in S26, and the function information acquired in S32. In S94, the CPU 62 does not generate the setting ID. For this reason, in S94, the CPU 62 generates the SC information without using the setting ID. Specifically, first, the CPU 62 acquires respective symbolic information from the multifunctional device 10 by using the ID table 66, thereby generating five pieces of symbolic information. The five pieces of symbolic information includes '0105Alice', '02043456', '030202', '0408ZZZZZZZZ' and '050201'. Then, the CPU 62 generates the SC information including the five generated pieces of symbolic information and the SC name 'SC2' acquired from the multifunctional device 10 in S92. In S96, the CPU 62 supplies the generated SC information to the multifunctional device 10.

The CPU 30 of the multifunctional device 10 acquires the SC information from the relay server 50. Then, in S98, the CPU 30 stores the acquired SC information in the SC information storage area 38 of the memory 32. As a result, the SC information 38b of FIG. 2 is stored in the SC information storage area 38. Thereby, the registration of the shortcut (more specifically, the SC information for displaying the format screen 408 (refer to FIG. 8)) for executing the scan UL function is completed. Hereinafter, the SC information (for example, the SC information including the SC name 'SC2') including the five pieces of symbolic information corresponding to the display name, the PIN code, the server name, the access token, and the function (i.e., not including the symbolic information corresponding to the setting ID) may also be referred to as 'second type SC information'.

As described above, also in the case B1, the CPU 30 of the multifunctional device 10 stores the second type SC information including the five symbolic pieces of information, in which the respective information such as the server name information, the display name information and the like is symbolized, in the memory 32 without storing the respective information such as the server name information, the display name information and the like in the memory 32. For this reason, as compared to a configuration where the respective information such as the server name information, the display name information and the like are stored without being symbolized, the information to be stored in the memory 32 of the multifunctional device 10 is reduced.

Subsequently, a case B2 where the SC information of the SC name 'SC2', which is the second type SC information, is selected by the user is described with reference to FIGS. 14 and 15.

In S200, the user selects the button 'Shortcut' while the main screen 300 of FIG. 12 is displayed on the display unit 14 of the multifunctional device 10. In this case, the CPU 30 of the multifunctional device 10 displays the shortcut screen 302 of FIG. 12 on the display unit 14. Then, in S201, the user selects the button 'SC2' displayed in the shortcut screen 302. In S202, the CPU 30 supplies the SC execution instruction to instruct execution of the shortcut to the relay server 50.

When the SC execution instruction is acquired from the multifunctional device 10, the CPU 62 of the relay server 50 supplies the SC information request for requesting the SC information selected in the multifunctional device 10 to the multifunctional device 10, in S204.

When the SC information request is acquired, the CPU 30 of the multifunctional device 10 reads out the SC information including the SC name 'SC2' selected in S201 from the SC information storage area 38 of the memory 32, in S206. Then, in S208, the CPU 30 supplies the read SC information to the relay server 50.

When the SC information is acquired from the multifunctional device 10, the CPU 62 of the relay server 50 reproduces the five pieces of information from the five pieces of symbolic information included in the SC information in accordance with the ID table 66, in S212. The five pieces of information reproduced in S212 is a combination of the five item information and the five setting information. Specifically, the five pieces of information is the respective information of 'Display Name=Alice', 'PIN Code=1234', 'Server Name=Server A', 'Access Token=XXXXXXXX' and 'Function=Scan Upload'. Since the SC information corresponding to the SC name 'SC2' is the second type SC information, the reproduced information does not include the setting ID. In S214, the CPU 62 supplies the format screen information stored in advance in the memory 64 to the multifunctional device 10.

When the format screen information is acquired from the relay server 50, the CPU 30 of the multifunctional device 10 displays the format screen 406 (FIG. 12) represented by the format screen information on the display unit 14. Since the contents of the format screen 406 are described above (refer to FIG. 8), the detailed descriptions thereof are omitted. In S216, the user selects the button 'PDF'. In this case, in S218, the CPU 30 supplies the format information indicating the format 'PDF' to the relay server 50.

When the format information is acquired from the multifunctional device 10, the CPU 62 of the relay server 50 supplies the profile screen information stored in advance in the memory 64 to the multifunctional device 10, in S220.

When the profile screen information is acquired from the relay server 50, the CPU 30 of the multifunctional device 10 displays the profile screen 408 (FIG. 12) represented by the profile screen information on the display unit 14. Since the contents of the profile screen 408 are described above, the detailed descriptions thereof are omitted. However, in the case B2, the information reproduced in S212 includes 'Server Name=Server B'. As described above, the service providing server 110 indicated by the server name 'Server B' does not correspond to the profile relating to a tag. For this reason, in the case B2, the profile screen 408 does not include a field for selecting a tag. In S222, the user selects the OK button 408e on the profile screen 408 at a state where the respective profiles of the scan size 'A4', the duplex scan 'OFF', the storage destination folder 'Folder 01', and the shortcut generation 'YES' are input. In this case, in S224, the CPU 30 of the multifunctional device 10 supplies the respective profiles input on the profile screen 408 to the relay server 50. That is, the profiles supplied to the relay server 50 in S224 are 'Scan Size=A4', 'Duplex Scan=OFF', 'Upload Folder=Folder 01' and 'Make Shortcut=YES'.

When the scan profile is acquired from the multifunctional device 10, the CPU 62 of the relay server 50 supplies the scan upload instruction and the screen information under execution to the relay server 50 in S226. The scan upload instruction includes the setting information group including the respective information such as 'Display Name=Alice', 'PIN Code=3456' and the like. The respective information included in the setting information group in S226 includes the information (combination of the five item information and the five setting information) reproduced in S212, the format information acquired in S218, and the respective profiles included in the scan profile acquired in S224.

When the scan upload instruction and the screen information under execution are acquired, the CPU 30 of the multifunctional device 10 displays the screen under execution 410 (FIG. 12) represented by the screen information under execution on the display unit 14. Since the contents of the screen under execution 410 are described above, the detailed descriptions thereof are here omitted. In S114, the CPU 30 enables the scanner unit 20 to scan a document in accordance with the format and scan profile included in the setting information group of the scan upload instruction. As a result, the image data is generated in accordance with the format and profiles included in the scan upload instruction. Then, in S116, the CPU 30 supplies the upload URL request to the relay server 50. Here, the upload URL is a URL indicating a position in the service providing server 110 at which the image data to be generated by the scan should be stored.

When the upload URL request is acquired from the multifunctional device 10, the CPU 62 of the relay server 50 supplies the upload URL stored in advance in the memory 64 to the multifunctional device 10, in S118.

When the upload URL is acquired from the relay server 50, the CPU 30 of the multifunctional device 10 supplies the upload request including the acquired upload URL and the image data generated by the scan in S114 to the service providing server (i.e., the server having the server name 'Server B') 110 without via the relay server 50, in S120.

When the upload request is acquired, the service providing server 110 stores the image data included in the upload request at the position indicated by the upload URL included in the upload request. That is, the execution of the scan UL function is completed. Then, in S122, the service providing server 110 supplies the OK information, which indicates that the image data is normally stored (i.e., uploaded), to the multifunctional device 10.

When the OK information is acquired, the CPU 30 of the multifunctional device 10 supplies the completion information, which indicates that execution of the scan UL function has been completed, to the relay server 50 in S124.

When the completion information is acquired, the CPU 62 of the relay server 50 determines in S126 that the profile (i.e., 'Make shortcut=Yes') indicating generation of a shortcut is included in the scan profile acquired in S224.

Figure 15:
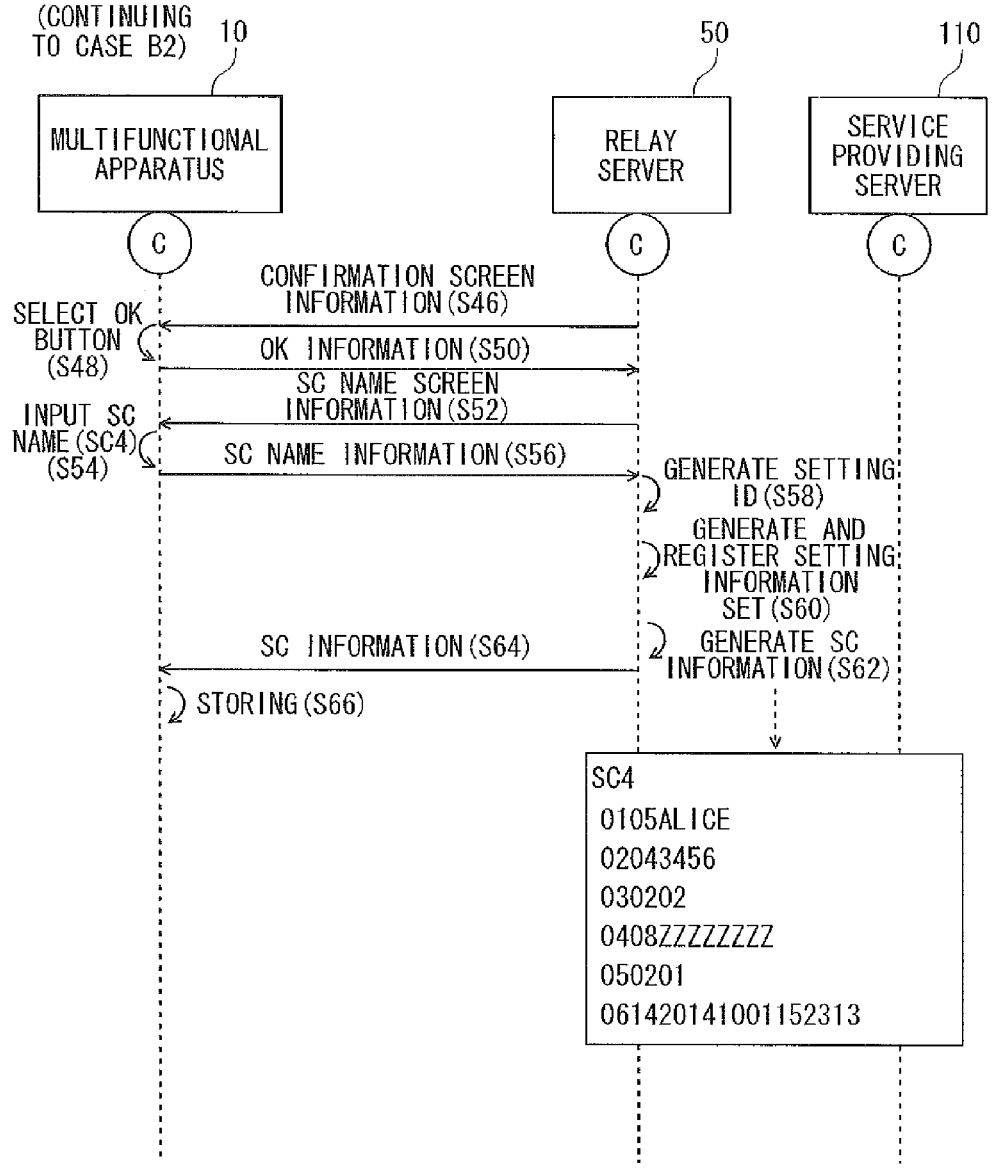
FIG. 15 is a view continuing to FIG. 14.

Thereafter, as shown in FIG. 15, the same processing as S46 to S66 of FIG. 6 is executed between the CPU 62 of the relay server 50 and the CPU 30 of the multifunctional device 10. However, in the case B2, the user inputs the SC name 'SC4' in the input field 416a of the SC name input screen 416 (refer to FIG. 12) and selects the OK button 416b in S54 of FIG. 15. In S56, the CPU 30 of the multifunctional device 10 supplies the SC name information, which indicates the SC name 'SC4' input in the input field 416a of the SC name input screen 416, to the relay server 50 (S56).

The CPU 62 of the relay server 50 acquires the SC name information from the multifunctional device 10. Then, in S58, the CPU 62 generates a unique setting ID (for example, '20141001152313'). Then, in S60, the CPU 62 generates the setting information set on the basis of the setting ID generated in S62, the format information acquired in S218 and the scan profile acquired in S224. In S60, the CPU 62 stores (i.e., registers) the generated setting information set in the database 68 of the memory 64.

Then, in S62, the CPU 62 generates the SC information (i.e., the first type SC information). The SC information generated in S62 of FIG. 15 includes the six pieces of symbolic information of '0105Alice', '02043456', '030202', '0408ZZZZZZZZ', '050201' and '061420141001152313'. Then, in S64, the CPU 62 generates the SC information including the six pieces of generated symbolic information and the SC name 'SC4' acquired from the multifunctional device 10 in S56. The CPU 62 supplies the generated SC information to the multifunctional device 10.

When the SC information is acquired from the relay server 50, the CPU 30 of the multifunctional device 10 stores the acquired SC information (i.e., the SC information of the SC name 'SC4') in the SC information storage area 38 of the memory 32 in S66. Thereby, the second type SC information (i.e., the SC information of the SC name 'SC2') stored in the memory 32 and the first type SC information (i.e., the SC information of the SC name 'SC4') are respectively stored. In a modified embodiment, in S66, the CPU 62 may store the acquired SC information in the SC information storage area 38 of the memory 32, instead of the SC information (i.e., the SC information of the SC name 'SC2') selected in S201 of FIG. 14. Also, the acquired SC information (i.e., the SC information of the SC name 'SC4') may be stored in the SC information storage area 38 of the memory 32, instead of the SC information (i.e., the SC information of the SC name 'SC2') selected in S201 of FIG. 14. That is, in the modified embodiment, the SC name 'SC2' may be overwritten to the SC name 'SC4', as the shortcut.

As described in the case B2, when the second type SC information is selected at the state where the second type SC information is stored in the memory 32, the CPU 30 of the multifunctional device 10 supplies the selected second type SC information to the relay server 50 (S208). Then, the CPU 30 executes the scan UL function by using the format information and scan profile input on the format screen 406 and profile screen 408 (refer to FIG. 12) and the respective information reproduced on the basis of the second type SC information. Therefore, when the second type SC information is selected by the user, the multifunctional device 10 can appropriately execute the scan UL function. Also, as shown in FIG. 15, when the scan UL function is executed after the second type SC information is selected, the CPU 30 acquires the first type SC information (for example, the SC information of the SC name 'SC4') from the relay server 50 and stores the same in the memory 32. For this reason, the CPU 30 is able to the first type SC information, which corresponds to the setting information of the scan UL function first executed, in the memory 32. Also, the SC name 'SC4' is prepared separately from the SC name 'SC2', so that it is possible to execute the scan UL function from the registered shortcut in conformity to the user's intention.

Meanwhile, in the illustrative embodiment, the SC registration for executing a function (for example, scan function) except for the scan UL function using the Web can also be performed. A case C1 for performing the SC registration for executing the scan function is described with reference to FIG. 16.

In S10, the user selects the button 'Shortcut' while the main screen 300 of FIG. 7 is displayed on the display unit 14 of the multifunctional device 10. In this case, the CPU 30 displays the shortcut screen 302 of FIG. 7 on the display unit 14 by using the shortcut screen information of the plurality of pieces of screen information 40 in the memory 32. Then, in S11, the user selects the button 'Add'. In this case, the CPU 30 displays the registration function screen 304 of FIG. 7 on the display unit 14 by using the function selection screen information of the plurality of pieces of screen information 40. In S100, the user selects the button 'Scan' included in the registration function screen 304 by operating the operation unit 12.

In this case, the CPU 30 displays the profile input screen 306 of FIG. 7 on the display unit 14 by using profile input screen information of the plurality of pieces of screen information 40. The profile input screen 306 of FIG. 7 is partially different from the profile screen 408 of FIG. 8. The profile input screen 306 includes a field 306a for inputting an SC name, a field 306b for selecting a format, a field 306c for selecting a scan size, a field 306d for selecting whether or not to perform duplex scan, a field 306e for selecting a storage destination folder of scan data, and the like. The profile input screen 306 further includes an OK button 306f for determining an SC name, a format and profiles input in the respective fields 306a to 306e and the like.

In S102, the user inputs the SC name 'SC3' in the field 306a, selects the format 'PDF' in the field 306b, selects the profiles 'A4', 'OFF' and 'Folder PC 90' in the fields 306c to 306e, and then selects the OK button 306f.

In this case, in S104, the CPU 30 stores the SC information including the SC name, the format and the profiles input in the respective fields 306a to 306e of the profile input screen 306 in the SC information storage area 38 of the memory 32. Thereby, the shortcut registration for executing the scan function is completed. In the following, the SC information including the respective scan settings input in the profile input screen 306 (for example, the SC information including the SC name 'SC3') may also be referred to as 'third type SC information'.

As described above, in the case C1, the CPU 30 stores the third type SC information including the respective scan settings input in the profile input screen 306 in the memory 32. It is possible to appropriately register the scan settings for executing the scan function, as the shortcut.

Subsequently, a case C2 where the SC information of the SC name 'SC3', which is the third type SC information, is selected by the user is described with reference to FIG. 17.

In S300, the user selects the button 'Shortcut' while the main screen 300 of FIG. 12 is displayed on the display unit 14 of the multifunctional device 10. In this case, the CPU 30 of the multifunctional device 10 displays the shortcut screen 302 of FIG. 12 on the display unit 14. Then, in S301, the user selects the button 'SC3' displayed in the shortcut screen 302. In this case, in S302, the CPU 30 reads out the SC information including the SC name 'SC3' selected in S301 from the SC information storage area 38 of the memory 32. Then, in S304, the CPU 30 enables the scanner unit 20 to scan a document in accordance with the format and profiles included in the read SC information. As a result, the image data is generated in accordance with the format and profiles included in the read SC information. The CPU 30 stores the image data in the storage place designated in the read SC information. Thereby, the scan processing is completed.

As described in the case C2, the CPU 30 of the multifunctional device 10 executes the scan function when the third type SC information is selected at the state where the third type SC information is stored in the memory 32. The user does not have to input the scan settings after selecting the third type SC information. Also, since it is possible to execute the function from the shortcut by the shortcut screen common to the shortcut screen upon the execution of the specific function using the service providing server, the user can easily perform the operation.

The cases A1 to C3 are summarized with reference to FIG. 18. The cases A1, A2, B1 and C1 are cases relating to the shortcut registration, and the cases A3, B2 and C2 are cases relating to the shortcut execution.

In the case A1 of FIG. 6, the user sequentially executes the shortcut selection (S10), the add selection (S11), the Web selection (S12), the server name selection (S18), the display name selection (S24), the function selection (S30), the format selection (S36) and the profile input (S42). As a result, the multifunctional device 10 registers (i.e., stores in the memory 32) the first type SC information (for example, the SC information of the SC name 'SC1').

In the case A2 of FIG. 10, the user sequentially executes the Web selection (S80), the server name selection (S18), the display name selection (S24), the function selection (S30), the format selection (S36) and the profile input (S42). As a result, the multifunctional device 10 registers the first type SC information (for example, the SC information of the SC name 'SC1') after executing the scan UL function.

Figure 11:
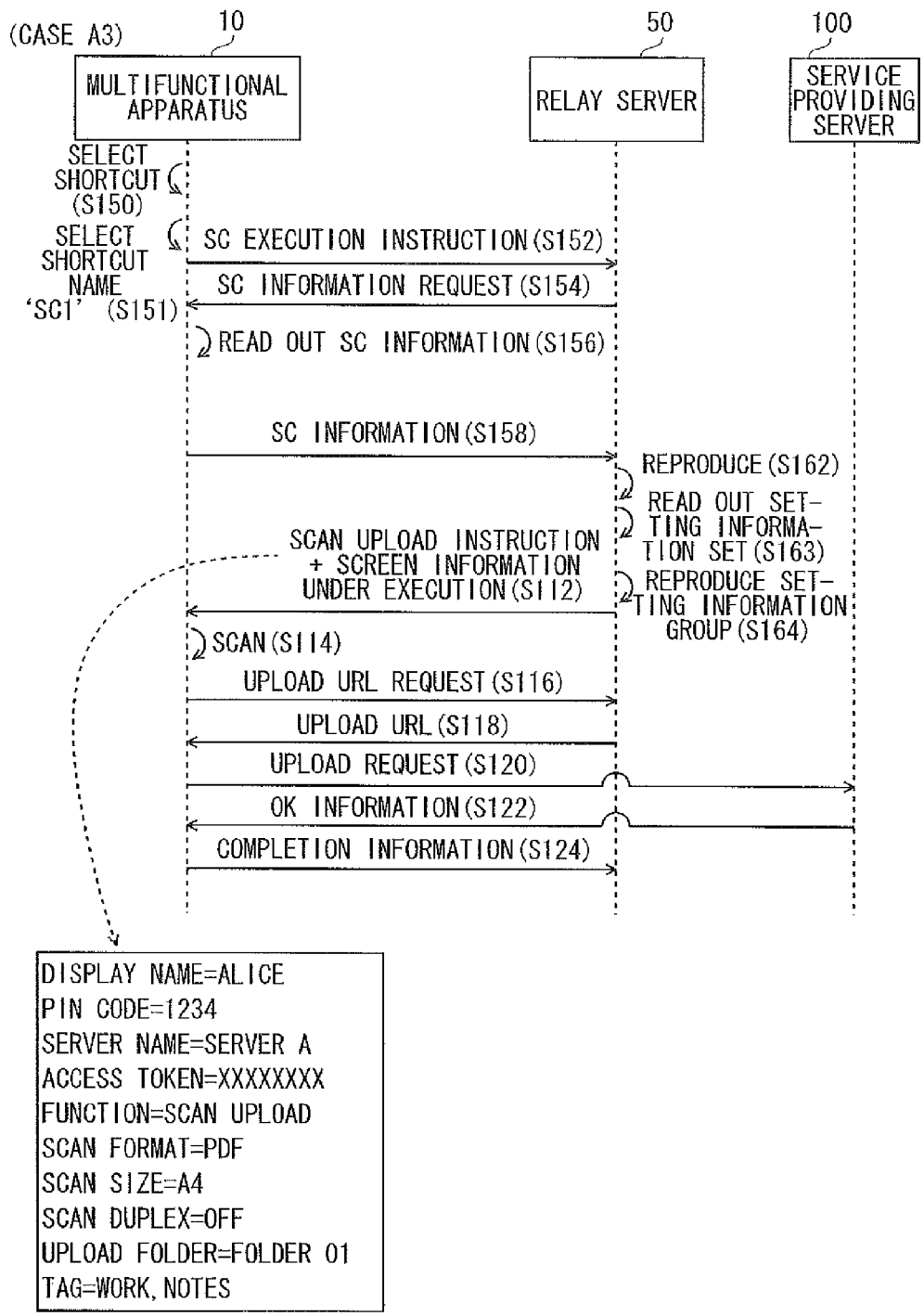
FIG. 11 is a sequence diagram of a case A3 in which a shortcut name 'SC1' is selected.

In the case A3 of FIG. 11, the user sequentially executes the shortcut selection (S150) and the first type SC information (for example, the SC information of the SC name 'SC1') selection (S151). As a result, the multifunctional device 10 executes the scan UL function.

Figure 13:
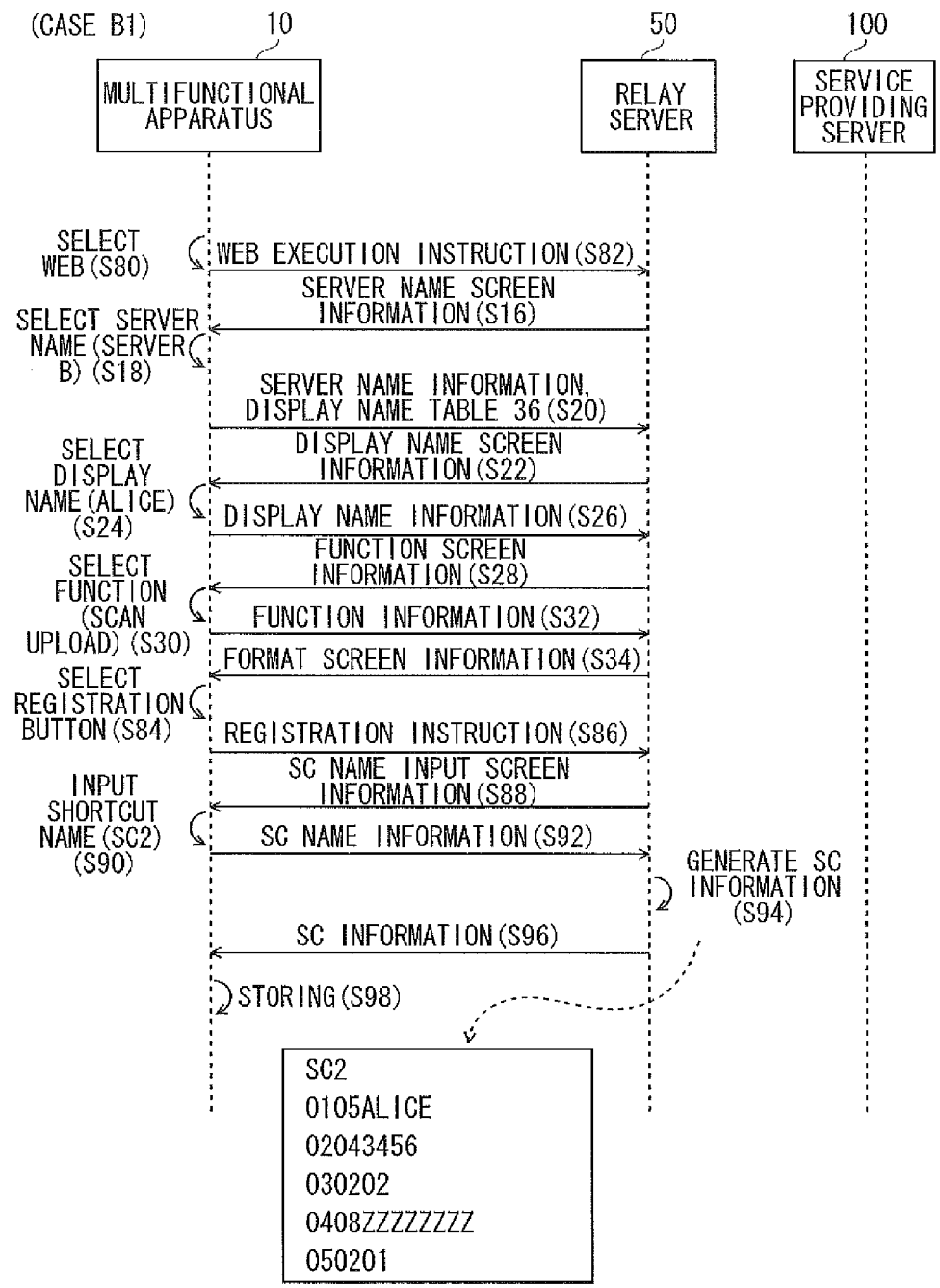
FIG. 13 is a sequence diagram of a case B1 for executing the shortcut registration.

In the case B1 of FIG. 13, the user sequentially executes the Web selection (S80), the server name selection (S18), the display name selection (S24), the function selection (S30) and the registration button selection (S84). As a result, the multifunctional device 10 registers the second type SC information (for example, the SC information of the SC name 'SC2').

Figure 14:
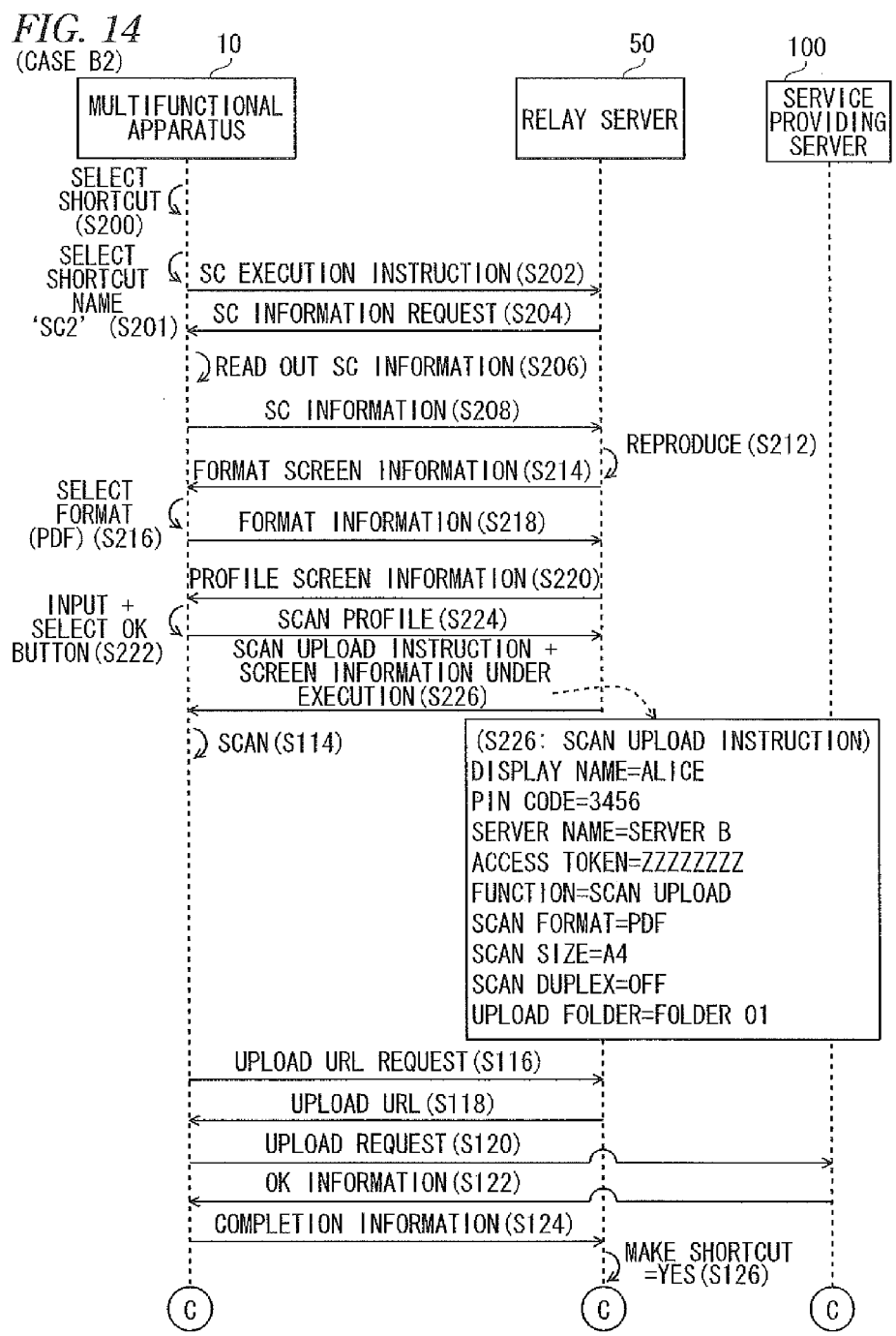
FIG. 14 is a sequence diagram of a case B2 in which a shortcut name 'SC2' is selected.

In the case B2 of FIGS. 14 and 15, the user sequentially executes the shortcut selection S200), the second type SC information (for example, the SC information of the SC name 'SC2') selection (S201), the format selection (S216), and the profile input (S222). As a result, the multifunctional device 10 registers the first type SC information (for example, the SC information of the SC name 'SC4') after executing the scan UL function.

Figure 16:
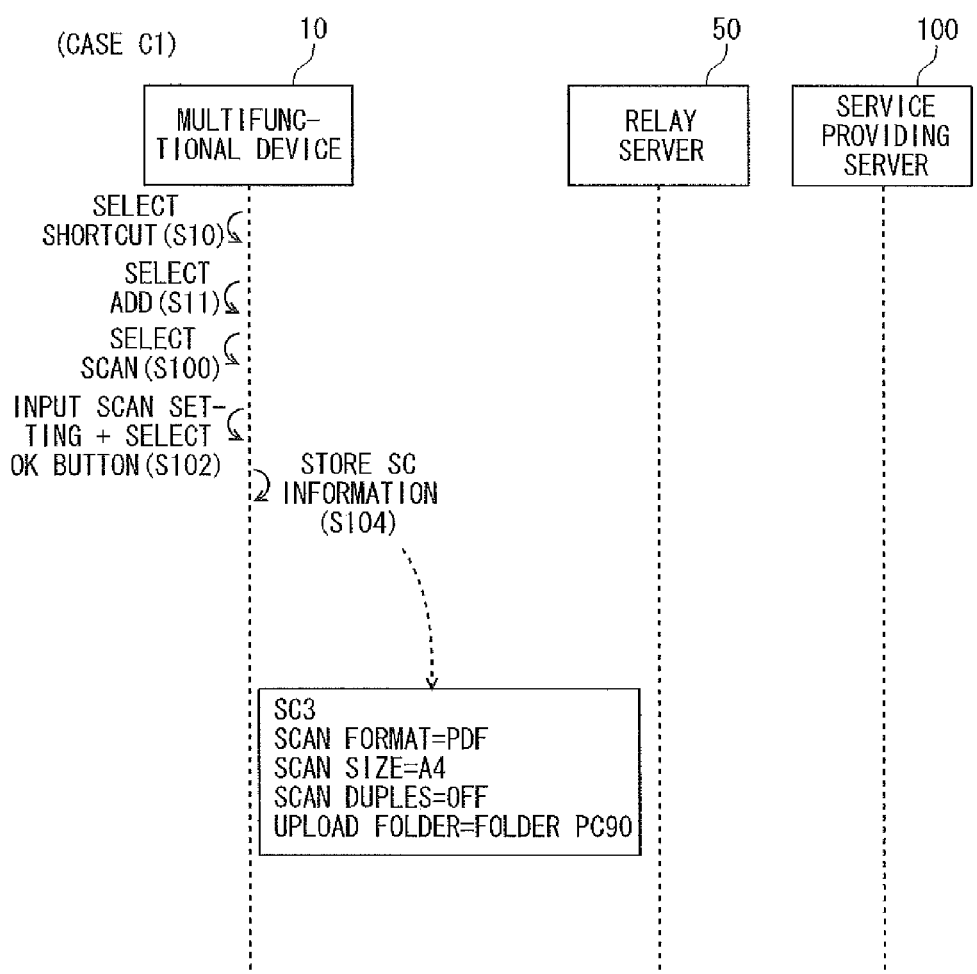
FIG. 16 is a sequence diagram of a case C1 for executing the shortcut registration.

In the case C1 of FIG. 16, the user sequentially executes the shortcut selection (S10), the add selection (S11), the scan selection (S100) and the scan setting input (S102). As a result, the multifunctional device 10 registers the third type SC information (for example, the SC information of the SC name 'SC3').

Figure 17:
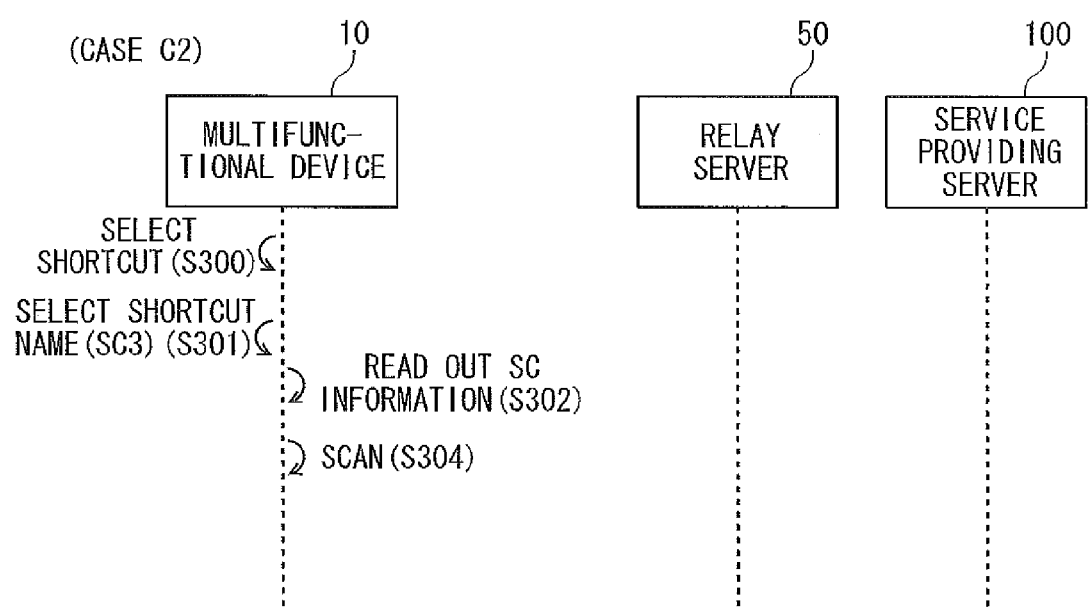
FIG. 17 is a sequence diagram of a case C2 in which a shortcut name 'SC3' is selected.

In the case C2 of FIG. 17, the user sequentially executes the shortcut selection (S300) and the third type SC information (for example, the SC information of the SC name 'SC3') selection (S301). As a result, the multifunctional device 10 executes the scan function.

The multifunctional device 10 and the relay server 50 are examples of 'the function execution apparatus' and 'the screen information server', respectively. The scanner unit 20 is an example of 'the function execution unit'. The scan UL function and the scan function are examples of 'the specific service' and 'the specific function', respectively. The server name screen information (S16 of FIG. 6), the display name screen information (S22), the function screen information (S28), the format screen information (S34) and the profile screen information (S40) are examples of 'the plurality of pieces of screen information'. The operations in S10, S11 and S12 of FIG. 6, the operation in S80 of FIG. 10, and the operation in S80 of FIG. 13 are examples of 'the first predetermined instruction'. The operations in S10, S11 and S100 of FIG. 16 are examples of 'the second predetermined instruction'.

The display name, the server name, the format, presence or absence of duplex scan, the scan size, the storage destination folder, and the tag are all examples of 'the plurality of setting information'. The information where the PIN code and the access token are additionally added to the display name, the server name, the function, the format, presence or absence of duplex scan, the scan size, the storage destination folder, and the tag is an example of 'the L setting information'. The setting ID is an example of 'the position information'. The display name, the server name, the function, the PIN code and the access token are examples of 'the M setting information'. The plurality of symbolic information included in the first type SC information and the second type SC information is an example of 'the M relation information'. The format, whether or not the duplex scan, the scan size, the folder and the tag are examples of 'the N setting information'. The information in which the item information indicating the item names of the respective setting items is associated with the format, whether or not the duplex scan, the scan size, the folder and the tag is an example of 'the N specific information'.

The service providing servers 100, 110 are examples of 'the first service providing server' and 'the second service providing server', respectively. The server names 'Server A' and 'Server B' are examples of 'the first server information' and 'the second server information', respectively. The tag is an example of 'the specific setting item'.

Figure 8:
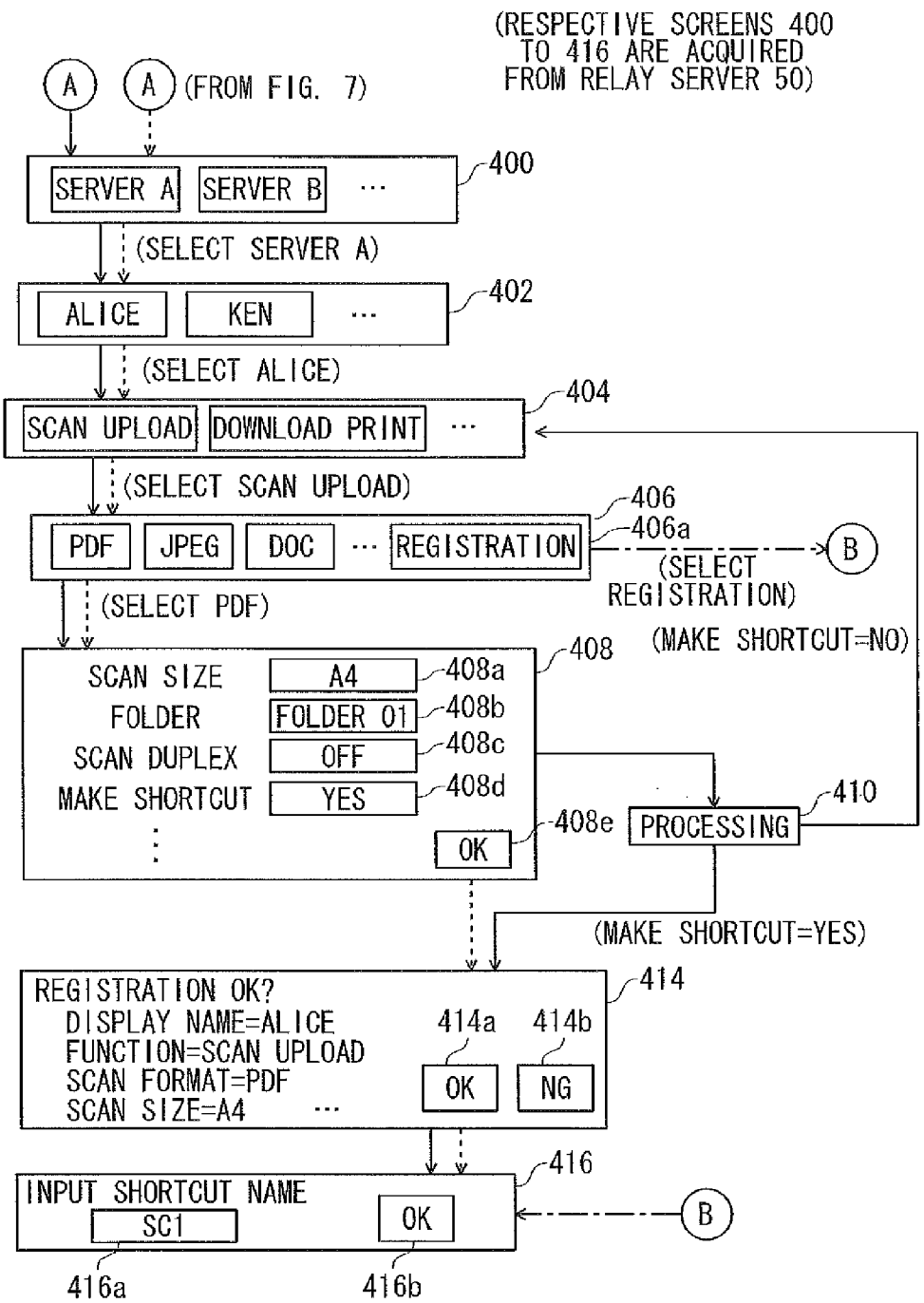
FIG. 8 illustrates each screen that is to be acquired from a relay server.

The first type SC information, the second type SC information and the third type SC information are examples of 'the first information group', 'the second information group' and 'the third information group', respectively. The scan upload instruction (S112 in FIGS. 10 and 11) is an example of 'the execution instruction information'. The scan in S114 of FIG. 11 and the upload request in S120 are examples of 'the function execution processing' and 'the first communication processing', respectively. The scan UL that is executed in FIG. 11 is an example of 'the first predetermined processing'. The button 'Web' in the main screen 300 (FIG. 7) and the button 'add' in the shortcut screen 302 (FIG. 7) are examples of 'the first icon' and 'the second icon', respectively. The upload request in S120 of FIG. 10 and the scan UL that is executed in FIG. 10 are examples of 'the second communication processing' and 'the second predetermined processing', respectively. The information (S42 in FIG. 6) of the field 408d for selecting whether or not to generate the shortcut in the profile screen information and the profile screen 408 (FIG. 8) are examples of 'the inquiry screen information' and 'the inquiry screen', respectively. The server name screen 400, the display name screen 402 and the function screen 404 of FIG. 8 are examples of 'the first type selection screen'. The format screen 406 and the profile screen 408 of FIG. 8 are examples of 'the second type selection screen'. The upload request in S120 of FIG. 14 and the scan UL that is executed in FIG. 14 are examples of 'the third communication processing' and 'the third predetermined processing', respectively. The PIN code and the access token are examples of 'the first type authentication information' and 'the second type authentication information', respectively. The profile input screen information stored in advance in the memory 32 and the profile input screen 306 (FIG. 12) are examples of 'the target screen information' and 'the target selection screen', respectively. The profile screen 408 is an example of 'the specific screen'. Also, the profile 'Make shortcut=Yes' is an example 'the registration instruction'.

The respective processing in which the CPU 30 of the multifunctional device 10 acquires the respective screen information from the relay server 50 is an example of the processing that is to be executed by 'the screen information acquisition unit'. The processing in which the CPU 30 of the multifunctional device 10 displays the respective screens shown in FIGS. 7, 8 and 12 on the display unit 14 in accordance with the respective screen information is an example of the processing that is to be executed by 'the display control unit'. The respective processing of S20, S26, S32, S38, S44 and S56 in FIG. 6 is an example of the processing that is to be executed by 'the setting information supply unit'. The processing of S64 is an example of the processing that is to be executed by 'the first information group acquisition unit'. The processing of S66 is an example of the processing that is to be executed by 'the storing control unit'. The processing of S158 in FIG. 11 is an example of the processing that is to be executed by 'the first information group supply unit'. The processing of S208 in FIG. 14 is an example of the processing that is to be executed by 'the second information group supply unit'. The processing of S112 is an example of the processing that is to be executed by 'the execution instruction information acquisition unit'. The processing of S114 to S124 is an example of the processing that is to be executed by 'the predetermined processing execution unit'. The processing of S304 in FIG. 17 is an example of the processing that is to be executed by 'the function control unit'.

The respective processing in which the CPU 62 of the relay server 50 supplies the respective screen information to the multifunctional device 10 is an example of the processing that is to be executed by 'the screen information supply unit'. The respective processing of S20, S26, S32, S38, S44 and S56 in FIG. 6 is an example of the processing that is to be executed by 'the setting information supply unit'. The processing of S60 in FIG. 6 is an example of the processing that is to be executed by 'the registration unit'. The processing of S64 is an example of the processing that is to be executed by 'the information group supply unit'. The processing of S162 to S164 in FIG. 11 is an example of the processing that is to be executed by 'the execution instruction information generation unit'. The processing of S112 is an example of the processing that is to be executed by 'the execution instruction information supply unit'. The processing of S124 is an example of the processing that is to be executed by 'the completion information supply unit'.

Although the specific examples of the present invention have been described in detail, the examples are just exemplary, not to limit the claims. The configurations explained in this disclosure may be applied with various changes and modifications. The modified embodiments of the illustrative embodiment are described in the following.

A first modified embodiment will be described as follows. When the CPU 30 of the multifunctional device 10 supplies the registration instruction to the relay server 50 in S14 of FIG. 6, the CPU 30 may collectively acquire, from the relay server 50, the respective screen information of the server name screen information, the display name screen information, the function screen information, the format screen information, the profile screen information, the confirmation screen information, the SC name input screen information, and the screen information under execution. The CPU 30 may be configured to sequentially display the respective screens (the screens 400 to 416 in FIG. 8) on the display unit 14 in accordance with the respective acquired screen information. In this modified embodiment, the operations of the CPU 30 are also examples of the processing that is to be executed by 'the screen information acquisition unit' and 'the display control unit'.

A second modified embodiment will be described as follows. In the above illustrative embodiment, the CPU 62 of the relay server 50 generates the first type SC information by symbolizing the respective information in S62 of FIG. 6. Also, in S64, the CPU 62 of the multifunctional device 10 acquires the first type SC information having the symbolic information included therein. The present invention is not limited thereto. For example, the CPU 62 of the relay server 50 may be configured to generate the first type SC information without symbolizing the respective information. That is, the first type SC information may include a combination (for example, 'Display Name=Alice') of the plurality of item information and the setting information, instead of the plurality of symbolic information (for example, '0105Alice'). In this modified embodiment, the first type SC information is also an example of 'the first type information group'. Also, the combination (for example, 'Display Name=Alice') of the plurality of item information and the setting information, which is included in the first type SC information, is also an example of 'the M relation information'.

A third modified embodiment will be described as follows. In the case A2 (FIG. 10), the CPU 30 of the multifunctional device 10 acquires the confirmation screen information from the relay server 50 (S46) after the scan UL is completed, and displays the confirmation screen on the display unit 14. However, the shortcut information may be registered without displaying the confirmation screen. Also, it may be possible to enable the user to select whether or not to perform the SC registration by the confirmation screen after the execution of the scan UL function, without enabling the user to select on the profile screen whether or not to generate the shortcut.

A fourth modified embodiment will be described as follows. Even when registering the shortcut for executing the DL print function, the devices 10, 50, 100 may execute the processing by the same method as the cases A1, A2 and B1 (FIGS. 6, 10 and 13). Also, even when executing the shortcut to execute the DL print function, the respective devices 10, 50, 100 may execute the processing by the same method as the cases A3 and B2 (FIGS. 11, 14 and 15).

A fifth modified embodiment will be described as follows. The 'function execution apparatus' is not limited to the multifunctional device 10 capable of executing both the print function and the scan function, and may be a printer capable of executing only a print function or a scanner capable of executing only a scan function.

A sixth modified embodiment will be described as follows. In the illustrative embodiment, the CPU 30 of the multifunctional device 10 and the CPU 62 of the relay server 50 execute the processing, in response to the software, so that the respective processing of the cases A1 to C3 is executed. Instead of this configuration, at least a part of the respective processing of the cases A1 to C3 may be implemented by hardware such as a logical circuit.

Also, the technical elements described in the specification or drawings exhibit technical usefulness individually or by a variety of combinations and are not limited to combinations defined in the claims at the time of the filing of the subject application. Also, the technologies described in the specification or drawings accomplish a plurality of purposes at the same time, and an accomplishment of those purposes is technical utility.

What is claimed is:

1. A function execution apparatus comprising:
a display unit;
a user interface;
a function execution unit including at least one of a scanner unit and a printer unit;
a processor; and
memory storing computer readable instructions that, when executed by the processor, causing the apparatus to perform:
screen information acquisition processing of acquiring a plurality of pieces of screen information from the screen information server when the user interface is operated by a user to issue a first predetermined instruction, each of the plurality of pieces of screen information representing a selection screen for enabling the user to select setting information corresponding to a setting item relating to a specific service that is provided by a service providing server;
display control processing of sequentially displaying each of the plurality of selection screens represented by the plurality of pieces of screen information on the display unit;
setting information supply processing of supplying L pieces of setting information, wherein L is an integer of 2 or larger, the setting information being selected as the user interface is operated by the user on the plurality of selection screens, to the screen information server;
first information group acquisition processing of acquiring a first information group including position information and M pieces of relation information, where M is an integer of 1 or larger and smaller than L, relating to M pieces of setting information of among the L pieces of setting information, from the screen information server as the L pieces of setting information is supplied to the screen information server, the position information being information for reading out N pieces of specific information, where N is an integer of 1 or larger and smaller than L, registered in the screen information server, and the N pieces of specific information including N pieces of setting information, which is different from the M pieces of setting information, among the L pieces of setting information;
storing control processing of storing the first information group in the memory;
first information group supply processing of supplying the first information group in the memory to the screen information server when the user operates the user interface to issue a first selection instruction for selecting the first information group in a state where the first information group is stored in the memory;
execution instruction information acquisition processing of acquiring execution instruction information from the screen information server as the first information group is supplied to the screen information server, the execution instruction information including at least one piece of setting information among the L pieces of setting information, which includes the N pieces of setting information included in the N pieces of specific information read out by the screen information server in accordance with the position information in the first information group and the M pieces of setting information relating to the M pieces of relation information in the first information group;
function execution processing of causing the function execution unit to execute a specific function relating to the specific service by utilizing at least one piece of the setting information included in the execution instruction information when the execution instruction information is acquired from the screen information server; and
first communication processing of receiving the specific service from a first service providing server when the execution instruction information is acquired from the screen information server.

2. The function execution apparatus according to claim 1, wherein the first predetermined instruction includes a selection by the user of a first icon for receiving the specific service among a plurality of icons included in a predetermined screen displayed on the display unit, wherein the memory stores the computer readable instructions that, when executed by the processor, further causing the function execution apparatus to perform:
in the function execution processing, causing the function execution unit to execute the specific function relating to the specific service by utilizing at least one piece of the setting information among the L pieces of setting information including the plurality of setting information when the plurality of setting information is selected on the plurality of selection screens by the user;
second communication processing of receiving the specific service from the first service providing server when the plurality of setting information is selected on the plurality of selection screens by the user;
in the first information group acquisition processing, acquiring the first information group from the screen information server after the second predetermined processing is executed; and
in the storing control processing, storing the first information group in the memory after the second predetermined processing is executed.

3. The function execution apparatus according to claim 2, wherein the memory stores the computer readable instructions that, when executed by the processor, further causing the function execution apparatus to perform:
in the screen information acquisition processing, acquiring inquiry screen information from the screen information server, the inquiry screen information representing an inquiry screen for inquiring the user whether or not to store the first information group in the memory;
in the display control processing, displaying the inquiry screen represented by the inquiry screen information on the display unit; and
in the first information group acquisition processing, acquiring the first information group from the screen information server when the user interface is operated by the user to select storing the first information group in the memory on the inquiry screen, and not acquiring the first information group from the screen information server when the user interface is operated by the user to not select storing the first information group in the memory on the inquiry screen.

4. The function execution apparatus according to claim 1,
wherein the first predetermined instruction includes a selection by the user of a second icon for storing the first information group in the memory among a plurality of icons included in a predetermined screen displayed on the display unit.

5. The function execution apparatus according claim 1,
wherein the memory stores the computer readable instructions that, when executed by the processor, further causing the function execution apparatus to perform:
in the display control processing, displaying one or more second type selection screens of the plurality of selection screens on the display unit after displaying one or more first type selection screens of the plurality of selection screens on the display unit,
wherein at least a part of the M pieces of setting information is selected on the one or more first type selection screens by the user, and
wherein the N pieces of setting information is selected on the one or more second type selection screens by the user.

6. The function execution apparatus according to claim 5,
wherein the memory is configured to further store a second information group different from the first information group,
wherein the second information group includes the M pieces of relation information and does not include the position information,
wherein the memory stores the computer readable instructions that, when executed by the processor, further causing the function execution apparatus to perform:
second information group supply processing of supplying the second information group in the memory to the screen information server when the user interface is operated by the user to issue a second selection instruction for selecting the second information group in a state where the second information group is stored in the memory;
in the screen information acquisition processing, acquiring one or more screen information representing the one or more second type selection screens from the screen information server as the second information group is supplied to the screen information server;
in the display control processing, displaying the one or more second type selection screens represented by the one or more screen information on the display unit;
in the function execution processing, causing the function execution unit to execute the specific function relating to the specific service by utilizing at least a part of the setting information among the N pieces of setting information selected on the one or more second type selection screens by the user and the M pieces of setting information relating to the M pieces of relation information in the second information group; and
third communication processing for receiving the specific service from the first service providing server by utilizing at least a part of the setting information among the N pieces of setting information selected on the one or more second type selection screens by the user and the M pieces of setting information relating to the M pieces of relation information in the second information group.

7. The function execution apparatus according to claim 6,
wherein the memory stores the computer readable instructions that, when executed by the processor, further causing the function execution apparatus to perform:
in the first information group acquisition processing, acquiring the first information group from the screen information server after the function execution processing and the third communication processing are executed; and
in the storing control processing, storing the first information group in the memory after the function execution processing and the third communication processing are executed.

8. The function execution apparatus according to claim 1,
wherein the M pieces of setting information include first type authentication information used for the function execution apparatus to receive the specific service from the first service providing server, and the first type authentication information that is to be generated by the first service providing server.

9. The function execution apparatus according to claim 1,
wherein the M pieces of setting information includes second type authentication information for authenticating the user.

10. The function execution apparatus according to claim 1,
wherein the memory is configured to further store in advance target screen information representing a target selection screen for enabling the user to select one or more setting information relating to the specific function,
wherein the memory stores the computer readable instructions that, when executed by the processor, further causing the function execution apparatus to perform:
in the display control processing, displaying the target selection screen represented by the target screen information stored in the memory on the display unit when the user interface is operated by the user to issue a second predetermined instruction;
in the storing control processing, storing a third information group including the one or more setting information in the memory when the one or more setting information is selected on the target selection screen by the user; and
in function execution processing, causing the function execution unit to execute the specific function by using the one or more setting information in the third information group when the user interface is operated by the user to issue a third selection instruction for selecting the third information group in a state where the third information group is stored in the memory.

11. The function execution apparatus according to claim 1,
wherein in a case where the M pieces of setting information includes first server information indicating the first service providing server, the N pieces of setting information includes specific setting information corresponding to a specific setting item, and
wherein in a case where the M pieces of setting information includes second server information indicating a second service providing server different from the first service providing server, the N pieces of setting information does not include the specific setting information.

12. The function execution apparatus according to claim 1,
wherein the specific function is a scan function for executing a document scanning operation, and
wherein the specific service is a service for storing scan data that is to be obtained by the document scanning operation.

13. The function execution apparatus according to claim 1,
- wherein the N pieces of specific information includes the N pieces of setting information and N pieces of item information indicating N pieces of setting items corresponding to the N pieces of setting information, and
- wherein the M pieces of relation information relates to the M pieces of setting information and M pieces of item information indicating M pieces of setting items corresponding to the M pieces of setting information.

14. The function execution apparatus according to claim 13,
- wherein each of the M pieces of relation information has a data amount smaller than a combination of one piece of setting information corresponding to each pieces of relation information and one piece of item information corresponding to each pieces of relation information.

15. A screen information server comprising:
- a processor; and
- memory storing computer readable instructions that, when executed by the processor, causing the screen information server to perform:
- screen information supply processing of supplying a plurality of pieces of screen information to a function execution apparatus, the plurality of pieces of screen information representing a plurality of selection screens for enabling a user of the function execution apparatus to select setting information corresponding to a plurality of setting items relating to a specific service that is provided by a service providing server;
- setting information acquisition processing of acquiring L pieces of setting information, where L is an integer of 2 or larger, from the function execution apparatus, the L pieces of setting information including a plurality of setting information that is to be selected on a plurality of selection screens represented by the plurality of pieces of screen information by the user;
- registration processing of registering N pieces of specific information, where N is an integer of 1 or larger and smaller than L, in the memory, the N pieces of specific information including N pieces of setting information, which is a part of the L pieces of setting information;
- information group supply processing of supplying an information group to the function execution apparatus, the information group including position information for reading out the N pieces of specific information stored in the memory and M pieces of relation information, where M is an integer of 1 or larger and smaller than L, and the M pieces of relation information relating to M pieces of setting information, which is different from the N pieces of setting information, among the L pieces of setting information;
- execution instruction information generation processing of reading out the N pieces of specific information from the memory in accordance with the position information in the information group and generating execution instruction information for instructing the function execution apparatus to execute predetermined processing when the information group is acquired from the function execution apparatus after the information group is supplied to the function execution apparatus, the execution instruction information including at least one piece of setting information among the L pieces of setting information, which includes the N pieces of setting information included in the N pieces of specific information and the M pieces of setting information relating to the M pieces of relation information in the information group; and
- execution instruction information supply processing of supplying the execution instruction information to the function execution apparatus.

16. The screen information server according to claim 15,
- wherein the memory stores the computer readable instructions that, when executed by the processor, further causing the screen information server to perform:
- completion information acquisition processing of acquiring completion information from the function execution apparatus, the completion information being information indicating that the function execution apparatus has completed the predetermined processing by utilizing at least one piece of the setting information, and the predetermined processing including function execution processing of causing a function execution unit of the function execution apparatus to execute a specific function and communication processing for receiving the specific service from a specific service providing server;
- in the registration processing, registering the N pieces of specific information in the memory when the completion information is acquired from the function execution apparatus; and
- in the information group supply processing, supplying the information group to the function execution apparatus when the completion information is acquired from the function execution apparatus.

17. The screen information server according to claim 16,
- wherein the plurality of pieces of screen information includes specific screen information representing a specific screen on which the user issues a registration instruction,
- wherein the memory stores the computer readable instructions that, when executed by the processor, further causing the screen information server to perform:
- in the registration processing, registering the N pieces of specific information in the memory when the registration instruction is issued on the specific screen; and
- in the information group supply processing, supplying the information group to the function execution apparatus when the registration instruction is issued on the specific screen.

18. The screen information server according to claim 15,
- wherein the plurality of pieces of screen information includes one or more first type screen information representing one or more first type selection screens and one or more second type screen information representing one or more second type selection screens that are to be displayed after displaying the one or more first type selection screens,
- wherein at least a part of the M pieces of setting information is selected on the one or more first type selection screens by the user, and
- wherein the N pieces of setting information is selected on the one or more second type selection screens by the user.

19. A non-transitory computer readable recording medium storing computer readable instructions for a screen information server that is provided with a processor, wherein the instructions, when executed by the processor, causing the screen information server to perform:
- screen information supply processing of supplying a plurality of pieces of screen information to a function execution apparatus, the plurality of pieces of screen information representing a plurality of selection screens for enabling a user of the function execution apparatus to select setting information corresponding to a plurality of setting items relating to a specific service that is provided by a service providing server;

setting information acquisition processing of acquiring L pieces of setting information, where L is an integer of 2 or larger, from the function execution apparatus, the L pieces of setting information including a plurality of setting information that is to be selected on a plurality of selection screens represented by the plurality of pieces of screen information by the user;

registration processing of registering N pieces of specific information, where N is an integer of 1 or larger and smaller than L, in the memory, the N pieces of specific information including N pieces of setting information, which is a part of the L pieces of setting information;

information group supply processing of supplying an information group to the function execution apparatus, the information group including position information for reading out the N pieces of specific information stored in the memory and M pieces of relation information, where M is an integer of 1 or larger and smaller than L, and the M pieces of relation information relating to M pieces of setting information, which is different from the N pieces of setting information, among the L pieces of setting information;

execution instruction information generation processing of reading out the N pieces of specific information from the memory in accordance with the position information in the information group and generating execution instruction information for instructing the function execution apparatus to execute predetermined processing when the information group is acquired from the function execution apparatus after the information group is supplied to the function execution apparatus, the execution instruction information including at least one piece of setting information among the L pieces of setting information, which includes the N pieces of setting information included in the N pieces of specific information and the M pieces of setting information relating to the M pieces of relation information in the information group; and execution instruction information supply processing of supplying the execution instruction information to the function execution apparatus.

* * * * *